(12) United States Patent
Lee et al.

(10) Patent No.: US 9,898,139 B2
(45) Date of Patent: Feb. 20, 2018

(54) ELECTRONIC DEVICE FOR PROVIDING HOVERING INPUT EFFECTS AND METHOD FOR CONTROLLING THE SAME

(71) Applicant: Samsung Electronics Co., Ltd., Suwon-si, Gyeonggi-do (KR)

(72) Inventors: Yu-Jin Lee, Seoul (KR); Sung Kwon, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/092,293

(22) Filed: Nov. 27, 2013

(65) Prior Publication Data

US 2014/0152623 A1    Jun. 5, 2014

(30) Foreign Application Priority Data

Nov. 30, 2012  (KR) ........................ 10-2012-0138274

(51) Int. Cl.
*G06F 3/042* (2006.01)
*G06F 3/0488* (2013.01)
*G06F 3/0354* (2013.01)

(52) U.S. Cl.
CPC .......... *G06F 3/042* (2013.01); *G06F 3/03545* (2013.01); *G06F 3/0488* (2013.01); *G06F 2203/04108* (2013.01)

(58) Field of Classification Search
CPC ................... G06F 3/0488; G06F 3/042; G06F 2203/04108; G06F 3/03545; G06F 3/044; G06F 3/046; G06F 3/033; G06F 3/017; G06F 3/041; G09G 5/02
See application file for complete search history.

(56) References Cited

U.S. PATENT DOCUMENTS

| | | | |
|---|---|---|---|
| 8,954,888 B2* | 2/2015 | Kasahara | G06F 3/0488 715/825 |
| 2004/0105040 A1 | 6/2004 | Oh et al. | |
| 2006/0214926 A1* | 9/2006 | Kolmykov-Zotov et al. | 345/179 |
| 2008/0042985 A1 | 2/2008 | Katsuhito et al. | |
| 2008/0046425 A1 | 2/2008 | Perski | |
| 2009/0265670 A1 | 10/2009 | Kim et al. | |
| 2009/0303199 A1 | 12/2009 | Cho et al. | |
| 2010/0115455 A1* | 5/2010 | Kim | G06F 3/04815 715/781 |
| 2011/0069022 A1* | 3/2011 | Yokota et al. | 345/173 |
| 2011/0175821 A1 | 7/2011 | King | |
| 2011/0234491 A1* | 9/2011 | Nurmi | 345/157 |

(Continued)

FOREIGN PATENT DOCUMENTS

CN  102662506 A  9/2012
EP  2 128 823 A1  12/2009

(Continued)

*Primary Examiner* — Jennifer Mehmood
*Assistant Examiner* — Sardis F Azongha
(74) *Attorney, Agent, or Firm* — Jefferson IP Law, LLP

(57) ABSTRACT

An electronic device for hovering input effects and a method for controlling the same are provided. The method includes displaying an input area on a display of the electronic device, sensing at least one of a position of an input means on the display and a height of the input means above the display, and displaying a hovering input effect, corresponding to a hovering input using the input means, in the input area.

18 Claims, 26 Drawing Sheets

(56) References Cited

U.S. PATENT DOCUMENTS

| | | |
|---|---|---|
| 2011/0248918 A1 | 10/2011 | Yoo et al. |
| 2012/0270533 A1 | 10/2012 | You |
| 2013/0120281 A1* | 5/2013 | Harris ........................ 345/173 |
| 2013/0229391 A1* | 9/2013 | DiVerdi ............... G06F 3/0488 345/179 |
| 2013/0271362 A1* | 10/2013 | Lozovsky ............ G06F 3/0488 345/156 |

FOREIGN PATENT DOCUMENTS

| | | |
|---|---|---|
| JP | 2007-157448 A | 6/2007 |
| JP | 2007-287118 A | 11/2007 |
| JP | 2009-157448 A | 7/2009 |
| JP | 2011-186550 A | 9/2011 |
| KR | 10-2011-0112606 A | 10/2011 |

* cited by examiner

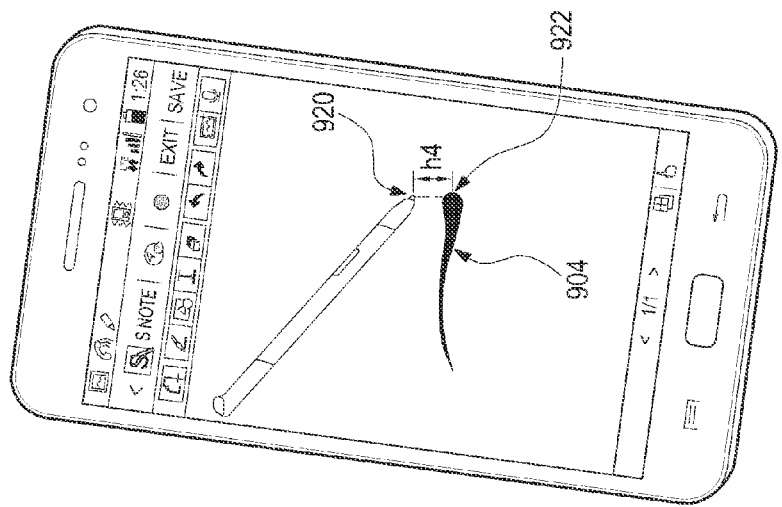
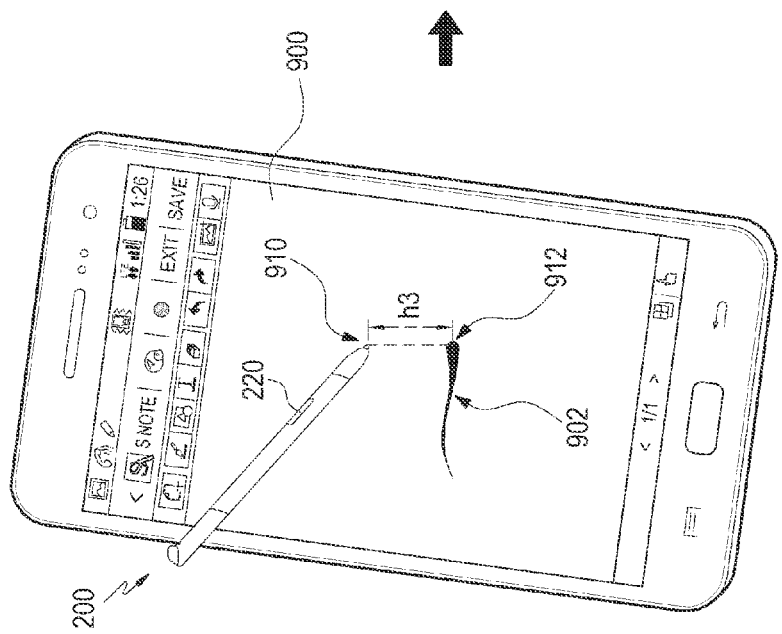

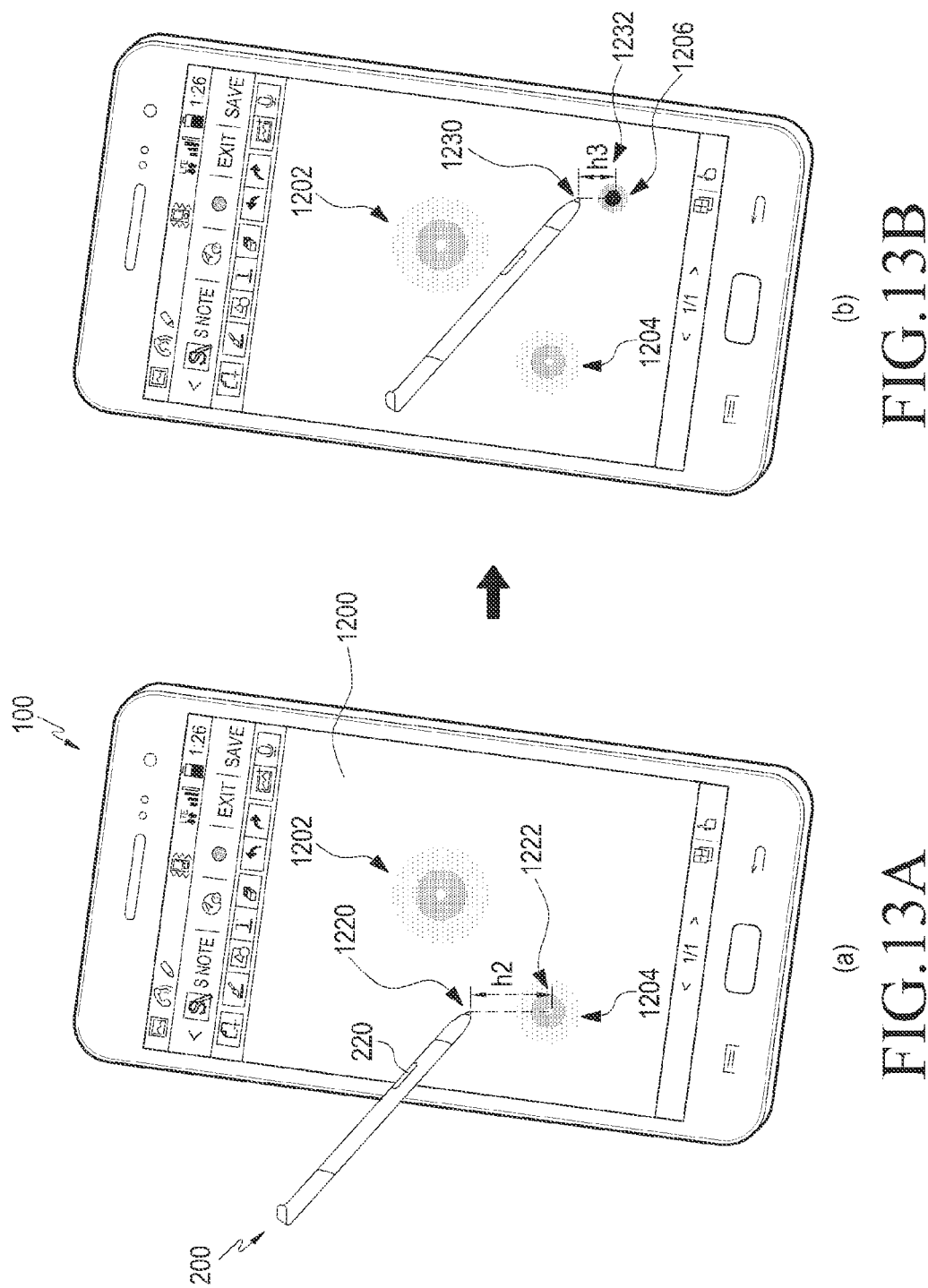

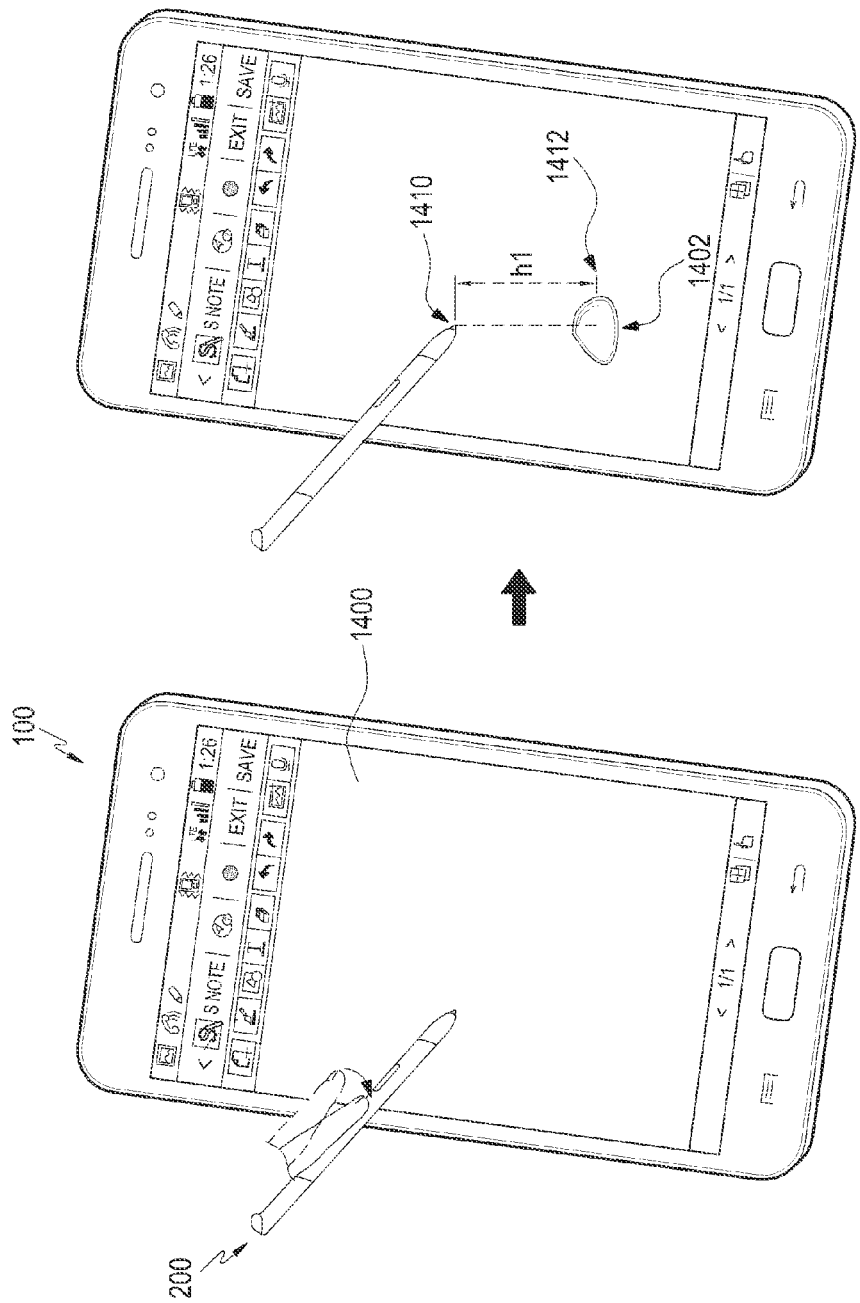

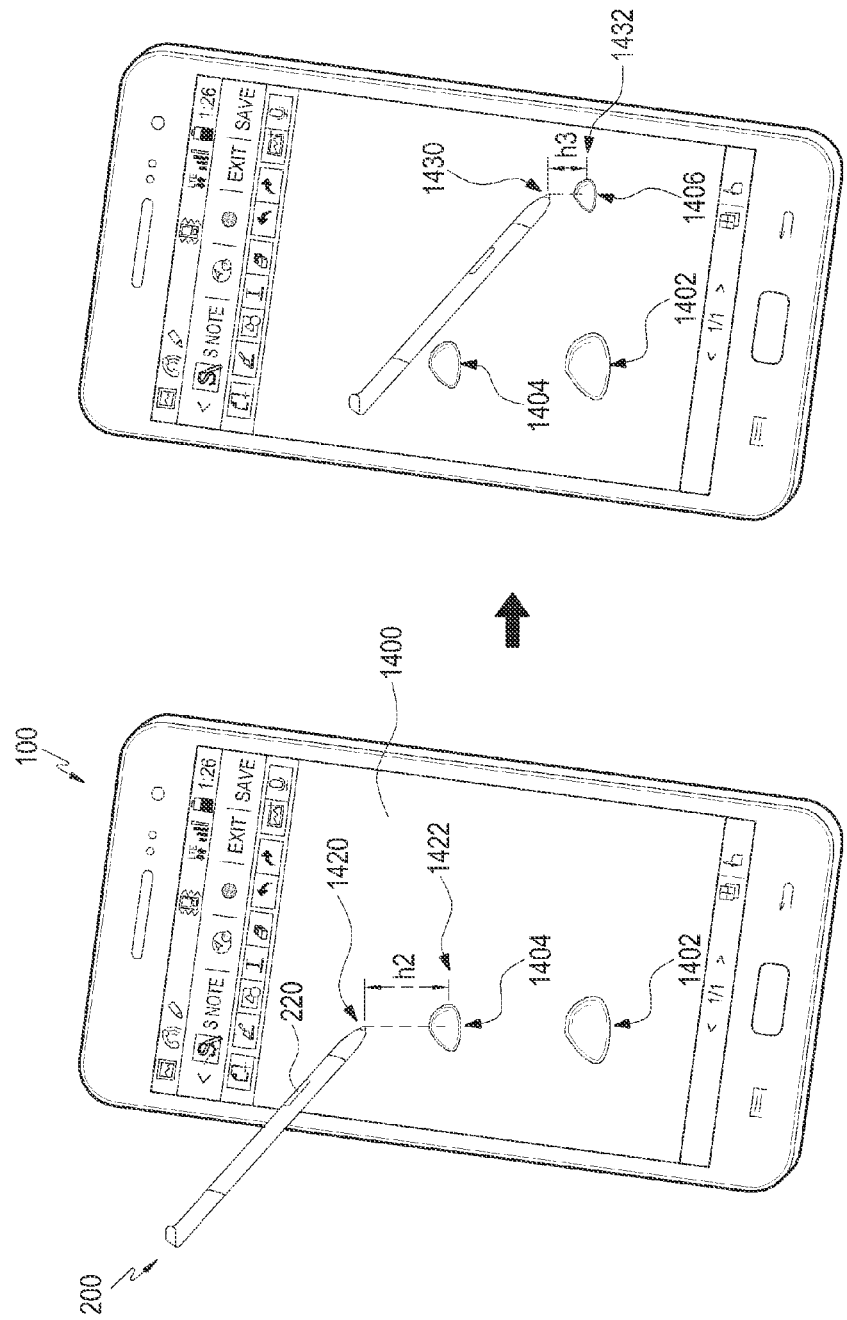

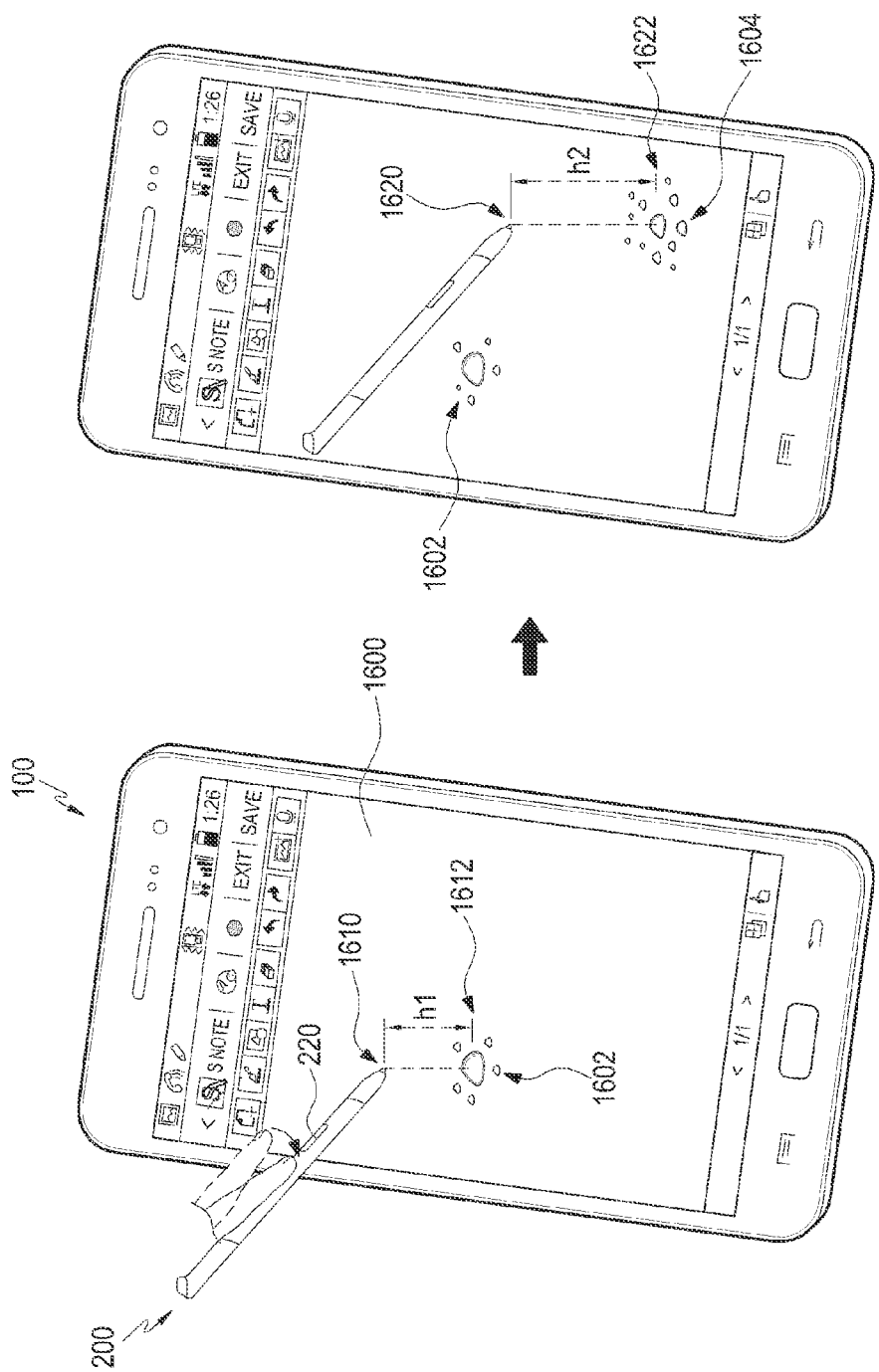

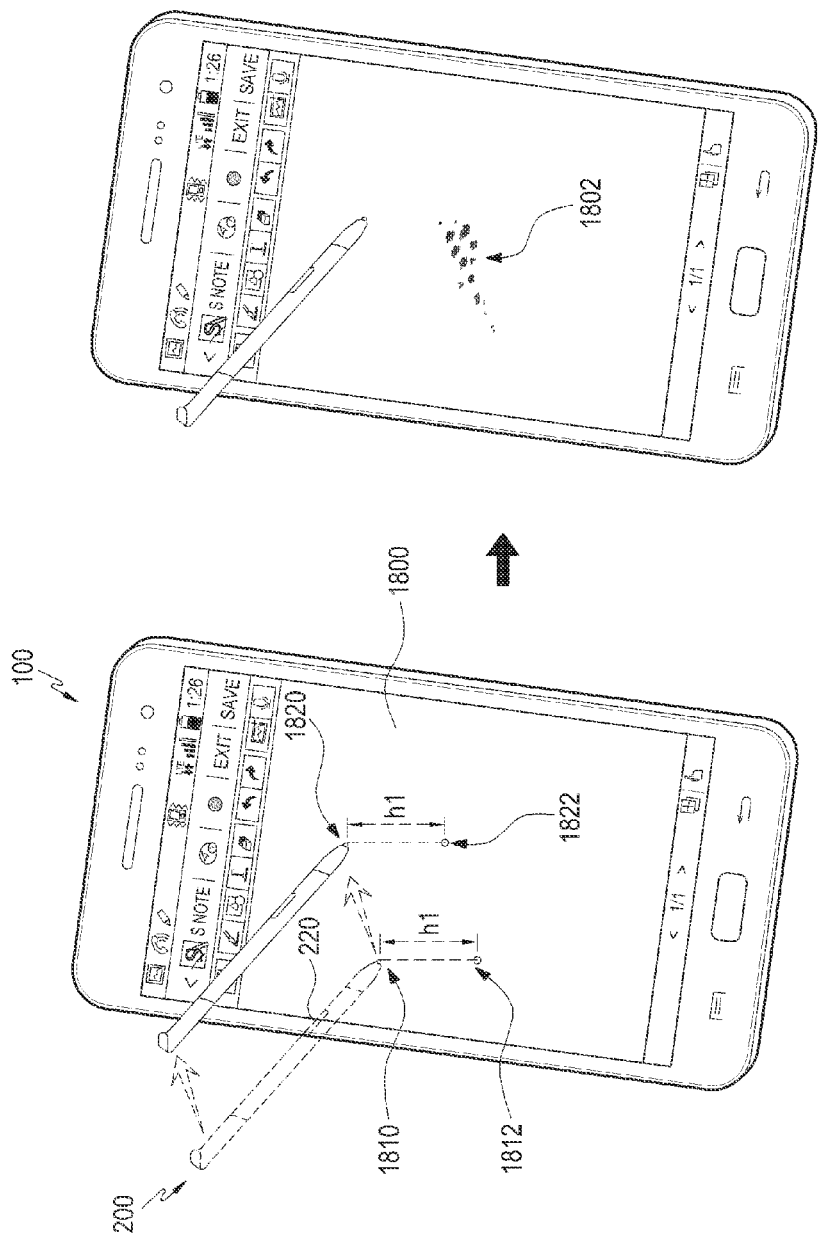

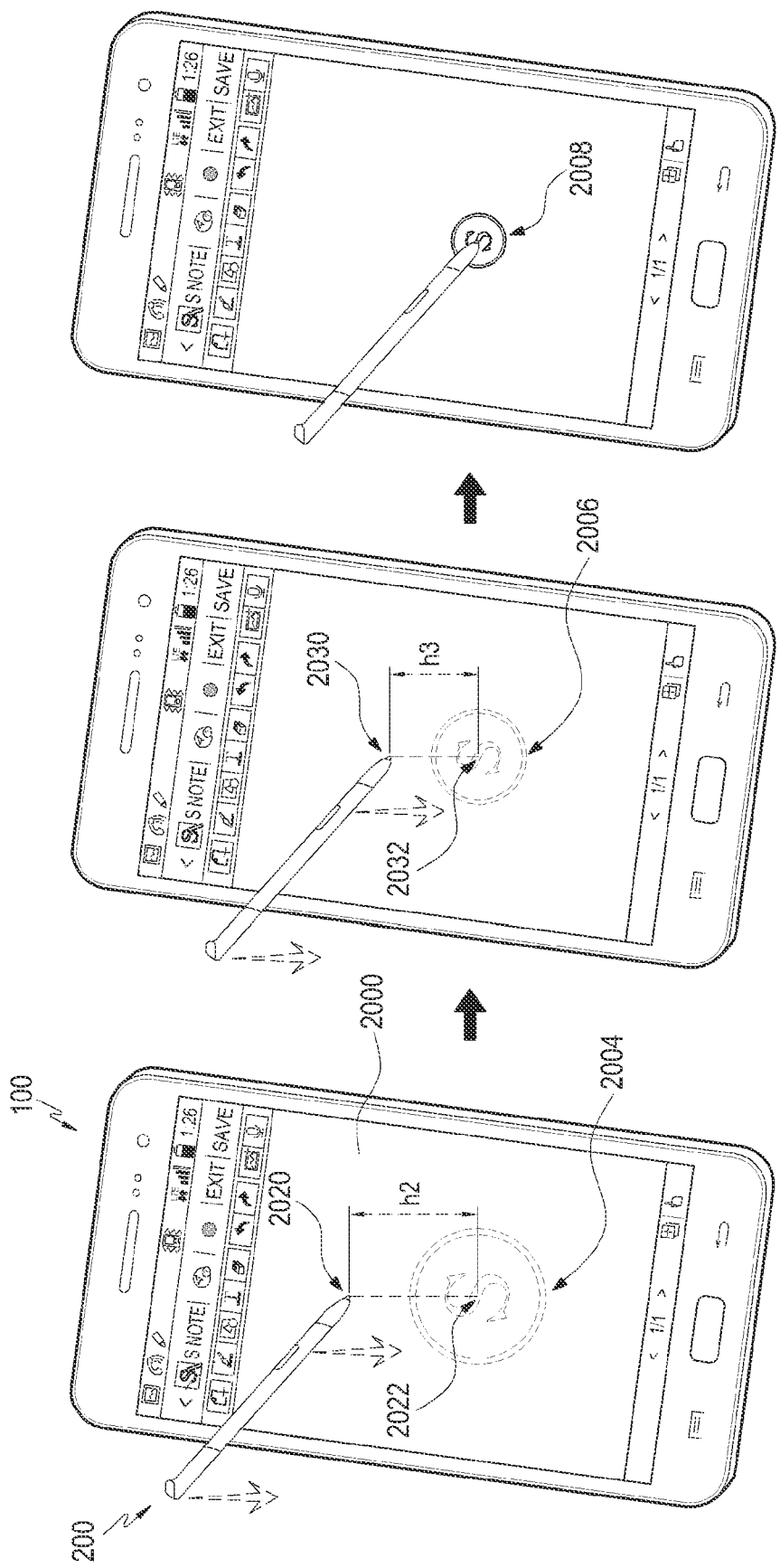

ELECTRONIC DEVICE FOR PROVIDING HOVERING INPUT EFFECTS AND METHOD FOR CONTROLLING THE SAME

PRIORITY

This application claims the benefit under 35 U.S.C. § 119(a) of a Korean patent application filed on Nov. 30, 2012 in the Korean Intellectual Property Office and assigned Serial No. 10-2012-0138274, the entire disclosure of which is hereby incorporated by reference.

BACKGROUND OF THE INVENTION

1. Field of the Invention

The present invention relates to a User Interface (UI) in an electronic device. More particularly, the present invention relates to a method for effectively providing hovering input effects.

2. Description of the Related Art

Various types of input modules are used for electronic devices. Input modules of the related art such as a keyboard and a mouse have recently been replaced with a touch screen in electronic devices.

A touch screen is used as an input module for receiving input data by sensing a user's touch as well as a display for displaying a screen in an electronic device. A capacitive touch screen or a resistive touch screen is popular. The touch screen can detect a user's finger touch on a capacitive or resistive touch panel.

A drawback with the touch screen of the related art is that it cannot receive an input other than a touch on the touch screen. This means that a user must contact his or her finger directly on the touch screen in order to apply a touch input. Another drawback is that an interface except for the user's direct touch cannot be provided. That is, the screen is confined to displaying the effect of a direct touch on a screen, without providing other effects. Accordingly, there exists a need for a technique for providing effects through various interfaces in addition to a user's direct touch.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an electronic device for providing hovering input effects and a method for controlling the electronic device, in which the hovering or touch of a touch pen is sensed separately from the touch of a finger or pen.

Another aspect of the present invention is to provide an electronic device for providing hovering input effects and a method for controlling the electronic device, in which a hovering input effect corresponding to a hovering input can be displayed in an input area.

Another aspect of the present invention is to provide an electronic device for providing hovering input effects and a method for controlling the electronic device, in which it is determined whether a selected input effect supports a hovering input function and a hovering input effect corresponding to a hovering input can be displayed in an input area based on a height according to the determination.

A further aspect of the present invention is to provide an electronic device for providing a hovering input effect and a method for controlling the electronic device, in which a pointer can be displayed on a display and a hovering input effect corresponding to a hovering input can be displayed in an input area according to a height.

In accordance with an aspect of the present invention, a method for controlling an electronic device for providing hovering input effects is provided. The method includes displaying an input area on a display of the electronic device, sensing at least one of a position of an input means on the display and a height of the input means above the display, and displaying a hovering input effect, corresponding to a hovering input using the input means, in the input area.

The method may further include determining whether a function for sensing the hovering input is active.

The hovering input effect may be displayed in the input area according to at least one of a position of the input means on the display or a height of the input means above the display.

The hovering input effect may be displayed in the input area according to a change in at least one of a position of the input means on the display and a height of the input means above the display.

The input means may be a touch pen or a finger.

The touch pen may include a coil and the display may include a touch screen. The touch screen may include an ElectroMagnetic Resonance (EMR) touch panel for sensing the touch pen based on EMR.

The touch screen may further include a capacitive touch panel and the controller may distinguish a touch on the capacitive touch panel from hovering over or a touch on the EMR touch panel.

The input means may be a touch pen and the hovering input may be at least one of pressing of a button of the touch pen, a tap of the touch pen, faster movement of the touch pen than a threshold velocity, and a touch on an icon.

The hovering input effect may be at least one of a brush writing effect of changing a stroke thickness, a chisel effect of changing a carved depth, a spray effect of changing a spray area, a droplet falling effect of changing a spreading area, an ink spreading effect of changing a spreading area, and a stamp effect.

The method may further include detecting selection of the hovering input effect, and determining whether the selected hovering input effect supports an input function for sensing the hovering input.

The method may further include displaying a pointer for the input means on the display.

In accordance with another aspect of the present invention, an electronic device for providing hovering input effects is provided. The electronic device includes a display configured to display an input area, and a controller configured to sense at least one of a position of an input means on, over, or relative to a display and a height of the input means above the display, and to display a hovering input effect, corresponding to the hovering input using the input means, in the input area.

The controller may be further configured to determine whether a function for sensing the hovering input is active.

The controller may be further configured to display the hovering input effect in the input area according to at least one of a position of the input device on the display and a height of the input means above the display.

The controller may be further configured to display the hovering input effect in the input area according to a change in at least one of a position of the input means on the display and a height of the input means above the display.

The input means may be a touch pen or a finger.

The touch pen may include a coil and the display may include a touch screen. The touch screen may include an EMR touch panel for sensing the touch pen based on EMR.

The touch screen may further include a capacitive touch panel and the controller may distinguish a touch on the capacitive touch panel from hovering over or a touch on the EMR touch panel.

The input means may be a touch pen and the hovering input may be at least one of pressing of a button of the touch pen, a tap of the touch pen, faster movement of the touch pen than a threshold velocity, and a touch on an icon.

The hovering input effect may be at least one of a brush writing effect of changing a stroke thickness, a chisel effect of changing a carved depth, a spray effect of changing a spray area, a droplet falling effect of changing a spreading area, an ink spreading effect of changing a spreading area, and a stamp effect.

The controller may be further configured to detect selection of the hovering input effect and to determine whether the selected hovering input effect supports a function for sensing the hovering input.

The controller may be further configured to display a pointer for the input means on the display.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features and advantages of certain exemplary embodiments of the present invention will be more apparent from the following description taken in conjunction with the accompanying drawings, in which:

FIGS. 8A and 8B and 9A and 9B illustrate operations for displaying a hovering input effect corresponding to a hovering input event in an input area in the electronic device for providing hovering input effects according to exemplary embodiments of the present invention;

FIGS. 12A, 12B, 13A, and 13B illustrate operations for displaying a spray effect of changing a sprayed area according to a height in an input area according to an exemplary embodiment of the present invention;

FIGS. 14A, 14B, 15A, and 15B illustrate operations for displaying a droplet falling effect of changing a droplet spreading area according to a height in an input area according to an exemplary embodiment of the present invention;

FIGS. 16A and 16B illustrates operations for displaying a droplet falling effect of changing a droplet splashed area according to a height in an input area according to an exemplary embodiment of the present invention;

FIGS. 18A, 18B, 19A, and 19B illustrate operations for displaying a sprinkling effect of changing a sprinkled area according to a height in an input area according to an exemplary embodiment of the present invention;

FIGS. 20A, 20B, and 21A to 21C illustrate operations for displaying a stamp effect according to a height in an input area according to an exemplary embodiment of the present invention;

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from spirit and scope of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While ordinal numbers like first, second, etc. can be used to describe a number of components, these components are not limited by the terms. The terms are used to distinguish one component from other components. For example, a first component may be referred to as a second component or vice versa within the scope and spirit of the present invention. The term 'and/or' means inclusion of a combination of a plurality of described associated items or one of the items.

The technical terms used in the present invention are provided simply to describe exemplary embodiments and are not intended to restrict the present invention. Herein, singular expressions include plural expressions unless otherwise clarified in the context. In this description, the term 'include' or 'have' is not interpreted as necessarily including all of the features, numbers, steps, operations, components, parts, or a combination thereof described in the specification. Rather, it should be understood that there are possibilities of omitting or adding one or more features, numbers, steps, operations, components, parts, or combinations thereof.

Figure 1:
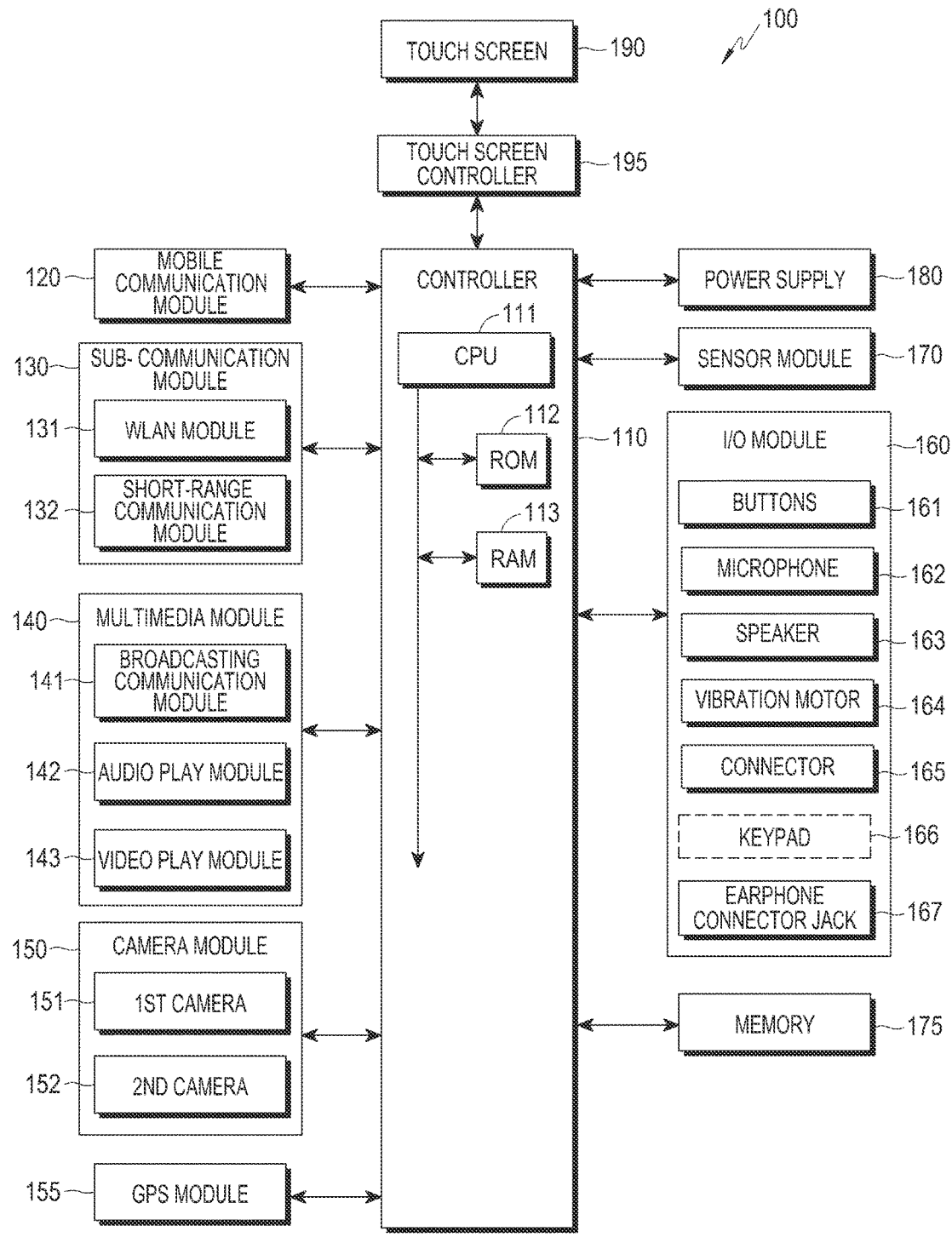
FIG. 1 is a block diagram of an electronic device according to an exemplary embodiment of the present invention.

FIG. 1 is a block diagram of an electronic device according to an exemplary embodiment of the present invention.

Referring to FIG. 1, the electronic device 100 may be connected to an external device (not shown) through an external device interface such as a sub-communication module 130, a connector 165, and an earphone connector jack 167. The term 'external device' covers a variety of devices that can be detachably connected to the electronic device 100 by wire, such as an earphone, an external speaker, a Universal Serial Bus (USB) memory, a charger, a cradle, a docking station, a Digital Multimedia Broadcasting (DMB) antenna, a payment device, a health care device (e.g., a blood sugar meter, etc.), a game console, a vehicle navigator, etc. The 'external device' may also include a device wirelessly connectable to the electronic device 100 by short-range communication, such as a Bluetooth communication device, a Near Field Communication (NFC) device, a Wireless Fidelity (WiFi) Direct communication device, a wireless Access Point (AP), etc. In addition, the external device may be any of another electronic device, a portable phone, a smart phone, a tablet PC, a desktop PC, a server, etc.

While the electronic device 100 may typically be a mobile device, it may also be any of a tablet, a desktop PC, a smart TV, a laptop, a music player, an MP3 player, etc.

Referring to FIG. 1, the electronic device 100 includes a display 190 and a display controller 195. The electronic device 100 further includes a controller 110, a mobile communication module 120, the sub-communication module 130, a multimedia module 140, a camera module 150, a Global Positioning System (GPS) module 155, an Input/Output (I/O) module 160, a sensor module 170, a memory 175, and a power supply 180. The sub-communication module 130 includes at least one of a Wireless Local Area Network (WLAN) module 131 and a short-range communication module 132, and the multimedia module 140 includes at least one of a broadcasting communication module 141, an audio play module 142, and a video play module 143. The camera module 150 includes at least one of a first camera 151 and a second camera 152, and the I/O module 160 includes at least one of buttons 161, a microphone 162, a speaker 163, a vibration motor 164, the connector 165, a keypad 166, and the earphone connector jack 167.

The controller 110 may include a Central Processing Unit (CPU) 111, a Read Only Memory (ROM) 112 for storing a control program to control the electronic device 100, and a Random Access Memory (RAM) 113 for storing signals or data received from the outside of the electronic device 100 or for use as a memory space for an operation performed by the electronic device 100. The CPU 111 may include a single core, dual cores, triple cores, or quad cores. The CPU 111, the ROM 112, and the RAM 113 may be connected to one another through an internal bus.

The controller 110 may control the mobile communication module 120, the sub-communication module 130, the multimedia module 140, the camera module 150, the GPS module 155, the I/O module 160, the sensor module 170, the memory 175, the power supply 180, the display 190, and the display controller 195.

The mobile communication module 120 connects the electronic device 100 to an external device through one or more antennas (not shown) by mobile communication under the control of the controller 110. The mobile communication module 120 transmits wireless signals to or receives wireless signals from a portable phone (not shown), a smart phone (not shown), a tablet PC (not shown), or another electronic device (not shown) that has a phone number input to the electronic device 100, for a voice call, a video call, a Short Message Service (SMS), or a Multimedia Messaging Service (MMS).

The sub-communication module 130 may include at least one of the WLAN module 131 and the short-range communication module 132. For example, the sub-communication module 130 may include the WLAN module 131 or the short-range communication module 132 alone or both.

The WLAN module 131 may be connected to the Internet under the control of the controller 110 in a place where a wireless AP (not shown) is installed. The WLAN module 131 supports the WLAN standard IEEE802.11x of the Institute of Electrical and Electronics Engineers (IEEE). The short-range communication module 132 may conduct short-range wireless communication between the electronic device 100 and an image forming device (not shown) under the control of the controller 110. The short-range communication may conform to Bluetooth, Infrared Data Association (IrDA), WiFi Direct, NFC, etc.

The electronic device 100 may include at least one of the mobile communication module 120, the WLAN module 131, and the short-range communication module 132 according to its capabilities. For example, the electronic device 100 may include a combination of the mobile communication module 120, the WLAN module 131, and the short-range communication module 132 according to its capabilities.

The multimedia module 140 may include the broadcasting communication module 141, the audio play module 142, or the video play module 143. The broadcasting communication module 141 may receive a broadcast signal (e.g., a TV broadcast signal, a radio broadcast signal, a data broadcast signal, etc.) and additional broadcasting information (e.g., an Electronic Program Guide (EPG), Electronic Service Guide (ESG), etc.) from a broadcasting station through a broadcasting communication antenna (not shown) under the control of the controller 110. The audio play module 142 may open a stored or received digital audio file (for example, a file having such an extension as mp3, wma, ogg, or wav) under the control of the controller 110. The video play module 143 may open a stored or received digital video file (for example, a file having such an extension as mpeg, mpg, mp4, avi, mov, or mkv) under the control of the controller 110. The video play module 143 may also open a digital audio file.

The multimedia module 140 may include the audio play module 142 and the video play module 143 without the broadcasting communication module 141. Or the audio play module 142 or the video play module 143 of the multimedia module 140 may be incorporated into the controller 110.

The camera module 150 may include at least one of the first camera 151 and the second camera 152, for capturing a still image or a video under the control of the controller 110. Further, the first camera 151 or the second camera 152 may include an auxiliary light source (e.g., a flash (not shown)) for providing a light intensity required for capturing an image. The first camera 151 may be disposed on the front surface of the electronic device 100, while the second camera 152 may be disposed on the rear surface of the device 100. Or, the first camera 151 and the second camera 152 may be arranged near to each other (e.g., the distance between the first camera 151 and the second camera 152 is between 1 cm and 8 cm) in order to capture a three-dimensional still image or video.

The GPS module 155 may receive radio waves from a plurality of GPS satellites (not shown) in Earth orbit and determine a position of the electronic device 100 based on the Time of Arrivals (ToAs) of satellite signals from the GPS satellites to the electronic device 100.

The I/O module 160 may include at least one of the plurality of buttons 161, the microphone 162, the speaker 163, the vibration motor 164, the connector 165, and the keypad 166.

The buttons 161 may be formed on the front surface, a side surface, or the rear surface of a housing of the electronic device 100, and may include at least one of a power/lock button, a volume button, a menu button, a home button, a back button, a search button, etc.

The microphone 162 receives a voice or a sound and converts the received voice or sound to an electrical signal under the control of the controller 110.

The speaker 163 may output sounds corresponding to various signals (e.g., a wireless signal, a broadcast signal, a digital audio file, a digital video file, a photo shot, etc.) received from the mobile communication module 120, the sub-communication module 130, the multimedia module 140, and the camera module 150 to the outside of the electronic device 100. The speaker 163 may output sounds corresponding to functions (e.g., a button manipulation sound, a ringback tone for a call, etc.) performed by the electronic device 100. One or more speakers 163 may be disposed at an appropriate position or positions of the housing of the electronic device 100.

The vibration motor 164 may convert an electrical signal to a mechanical vibration under the control of the controller 110. For example, when the electronic device 100 receives an incoming voice call from another electronic device (not shown) in vibration mode, the vibration motor 164 operates. One or more vibration motors 164 may be mounted inside the housing of the electronic device 100. The vibration motor 164 may operate in response to a user's touch on the display 190 configured into a touch screen and a continuous movement of the touch on the display 190.

The connector 165 may be used as an interface for connecting the electronic device 100 to an external device (not shown) or a power source (not shown). The connector 165 may transmit data stored in the memory 175 to the external device via a cable connected to the connector 165 or may receive data from the external device via the cable, under the control of the controller 110. The external device may be a docking station and the data may be a signal received from an external input device, for example, a mouse or a keyboard. The electronic device 100 may receive power or charge a battery (not shown) from the power source via the cable connected to the connector 165.

The keypad 166 may receive a key input from the user to control the electronic device 100. The keypad 166 includes a physical keypad (not shown) formed in the electronic device 100 or a virtual keypad (not shown) displayed on the display 190. The physical keypad may not be provided according to the capabilities or configuration of the electronic device 100.

An earphone (not shown) may be connected to the electronic device 100 by being inserted into the earphone connector jack 167.

The sensor module 170 includes at least one sensor for detecting a state of the electronic device 100. For example, the sensor module 170 may include a proximity sensor for detecting whether the user is close to the electronic device 100, an illumination sensor (not shown) for detecting the amount of ambient light around the electronic device 100, a motion sensor (not shown) for detecting a motion of the electronic device 100 (e.g., rotation, acceleration, vibration, etc. of the electronic device 100), a geomagnetic sensor (not shown) for detecting a point of the compass using the earth's magnetic field, a gravity sensor (not shown) for detecting the direction of gravity, an altimeter (not shown) for detecting an altitude by measuring the air pressure, and the like. At least one sensor may detect a state of the electronic device 100, generate a signal corresponding to the detected state, and transmit the generated signal to the controller 110. A sensor may be added to or removed from the sensor module 170 according to the capabilities of the electronic device 100.

The memory 175 may store input/output signals or data in accordance with operations of the mobile communication module 120, the sub-communication module 130, the multimedia module 140, the camera module 150, the GPS module 155, the I/O module 160, the sensor module 170, and the display 190 under the control of the controller 110. The memory 175 may store a control program for controlling the electronic device 100 or the controller 110, and applications.

The term "memory" may include the memory 175, the ROM 112 and the RAM 113 within the controller 110, or a memory card (not shown) (e.g., a Secure Digital (SD) card, a memory stick, etc.) mounted to the electronic device 100. The memory may include a non-volatile memory, a volatile memory, a Hard Disk Drive (HDD), a Solid State Drive (SSD), and the like.

The power supply 180 may supply power to one or more batteries (not shown) mounted in the housing of the electronic device 100 under the control of the controller 110. The one or more batteries supply power to the electronic device 100. Further, the power supply 180 may supply power received from an external power source (not shown) via the cable connected to the connector 165 to the electronic device 100. The power supply 180 may also supply power received wirelessly from the external power source to the electronic device 100 by a wireless charging technology.

The display 190 may include a touch screen and may provide User Interfaces (UIs) corresponding to various services (e.g., call, data transmission, broadcasting, photo taking, etc.) to the user. The touch screen 190 may transmit an analog signal corresponding to at least one touch on a UI to the display controller 195. The touch screen 190 may receive at least one touch input through a user's body part (e.g., a finger) or a touch input tool (e.g., a stylus pen). Also, the touch screen 190 may receive a touch input signal corresponding to a continuous movement of a touch among one or more touches. The touch screen 190 may transmit an analog signal corresponding to the continuous movement of the input touch to the touch screen controller 195.

In exemplary embodiments of the present invention, 'touch' may include a non-contact touch, not limited to contacts between the touch screen 190 and the user's body part or the touch input tool. A gap detectable to the touch screen 190 may vary according to the capabilities or configuration of the electronic device 100.

The touch screen 190 may be implemented by, for example, a resistive type, a capacitive type, an ElectroMagnetic Resonance (EMR) type, an infrared type, an acoustic wave type, or a combination of two or more of them.

The touch screen controller 195 converts an analog signal received from the touch screen 190 to a digital signal (e.g., X and Y coordinates). The controller 110 may control the touch screen 190 using the digital signal received from the touch screen controller 195. For example, the controller 110 may control selection or execution of a shortcut icon (not shown) displayed on the touch screen 190 in response to a touch. The touch screen controller 195 may be incorporated into the controller 110.

Figure 2:
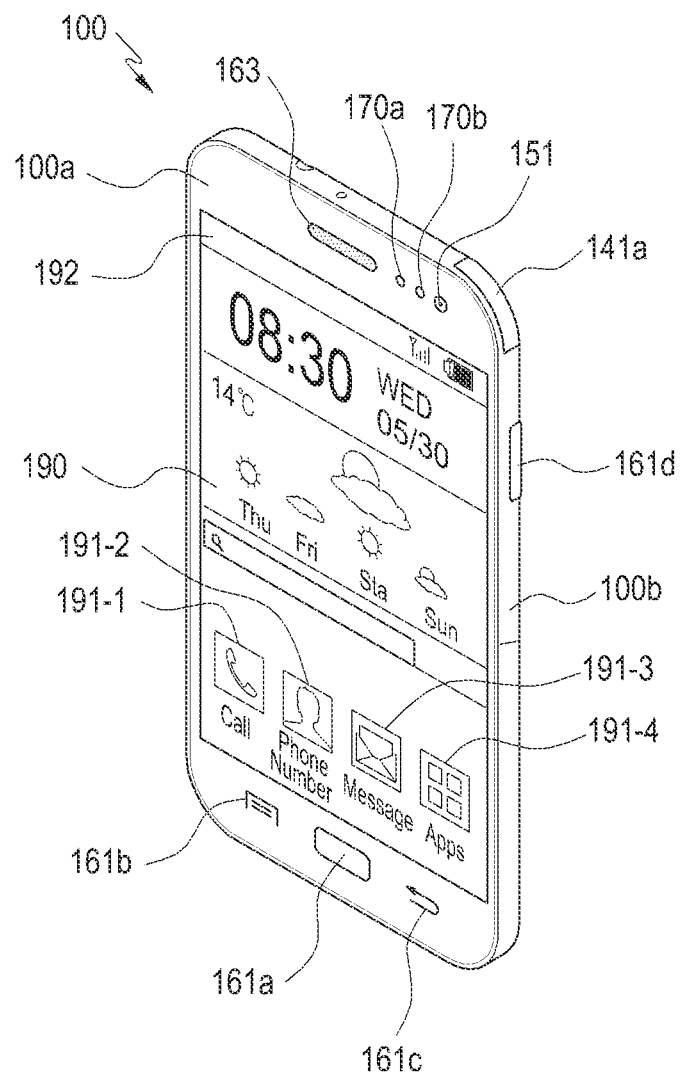
FIG. 2 is a front perspective view of an electronic device according to an exemplary embodiment of the present invention.
Figure 3:
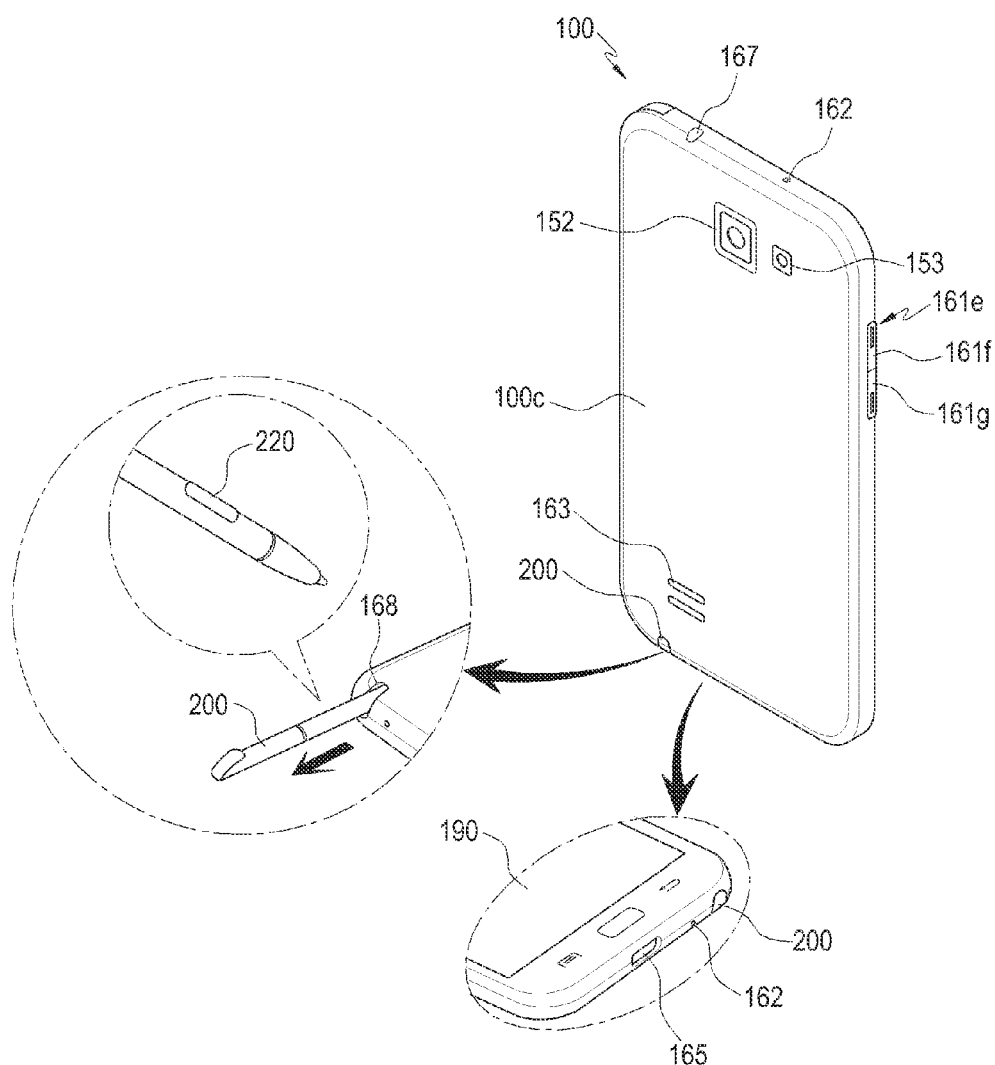
FIG. 3 is a rear perspective view of an electronic device according to an exemplary embodiment of the present invention.

FIGS. 2 and 3 are front and rear perspective views of an electronic device respectively according to an exemplary embodiment of the present invention.

Referring to FIG. 2, the display 190 configured into a touch screen is disposed at the center of the front surface 100a of the electronic device 100, occupying almost the entirety of the front surface 100a. In FIG. 2, a main home screen is displayed on the touch screen 190, by way of example. The main home screen is the first screen to be displayed on the touch screen 190, when the electronic device 100 is powered on. In the case where the electronic device 100 has different home screens of a plurality of pages, the main home screen may be the first of the home screens of the plurality of pages. Shortcut icons 191-1, 191-2 and 191-3 for executing frequently used applications, an application switch key 191-4, time, weather, etc. may be displayed on the home screen. The application switch key 191-4 is used to display application icons representing applications on the touch screen 190. A status bar 192 may be displayed at the top of the touch screen 190 in order to indicate states of the electronic device 100 such as a battery charged state, a received signal strength, and a current time.

A home button 161a, a menu button 161b, and a back button 161c may be formed at the bottom of the touch screen 190.

The home button 161a is used to display the main home screen on the touch screen 190. For example, upon pressing (or touching) of the home button 161a while any home screen other than the main home screen or a menu screen is displayed on the touch screen 190, the main home screen may be displayed on the touch screen 190. Upon pressing (or touching) of the home button 161a during execution of applications on the home screen 190, the main home screen illustrated in FIG. 2 may be displayed on the touch screen 190. The home button 161a may also be used to display recently used applications or a task manager on the touch screen 190.

The menu button 161b provides link menus available on the touch screen 190. The link menus may include a widget adding menu, a background changing menu, a search menu, an edit menu, an environment setting menu, etc. During execution of an application, the menu button 161b may provide a link menu linked to the application.

The back button 161c may display a screen previous to a current screen or end the latest used application.

The first camera 151, an illumination sensor 170a, and a proximity sensor 170b may be arranged at a corner of the front surface 100a of the electronic device 100, whereas the second camera 152, a flash 153, and the speaker 163 may be arranged on the rear surface 100c of the electronic device 100. Also, the speaker 163 may be arranged on the front surface 100a of the electronic device 100.

For example, a power/reset button 161d, a volume button 161e, including a volume up button 161f and a volume down button 161g, a terrestrial DMB antenna 141a for receiving a broadcast signal, and one or more microphones 162 may be disposed on side surfaces 100b of the electronic device 100. The DMB antenna 141a may be mounted to the electronic device 100 fixedly or detachably.

The connector 165 is formed on the bottom side surface of the electronic device 100. The connector 165 includes a plurality of electrodes and may be connected to an external device by wire. The earphone connector jack 167 may be formed on the top side surface of the electronic device 100, for allowing an earphone to be inserted.

Referring to FIG. 3, the second camera 152 and the flash 153 may be arranged at an upper part of the rear surface 100c of the electronic device 100.

The connector 165 is formed at the bottom side surface of the electronic device 100. The connector 165 may include a plurality of electrodes and may be connected to an external device by wire. The earphone connector jack 167 may be formed on the top side surface of the electronic device 100, for allowing an earphone to be inserted.

An insertion hole 168 may be formed into the bottom side surface of the electronic device 100, for allowing a touch pen 200 configured separately from the electronic device 100 to be inserted. Thus, the touch pen 200 may be inserted into the insertion hole 168. As illustrated in FIG. 3, the touch pen 200 includes a button 220 having a function that will be described below.

Figure 4:
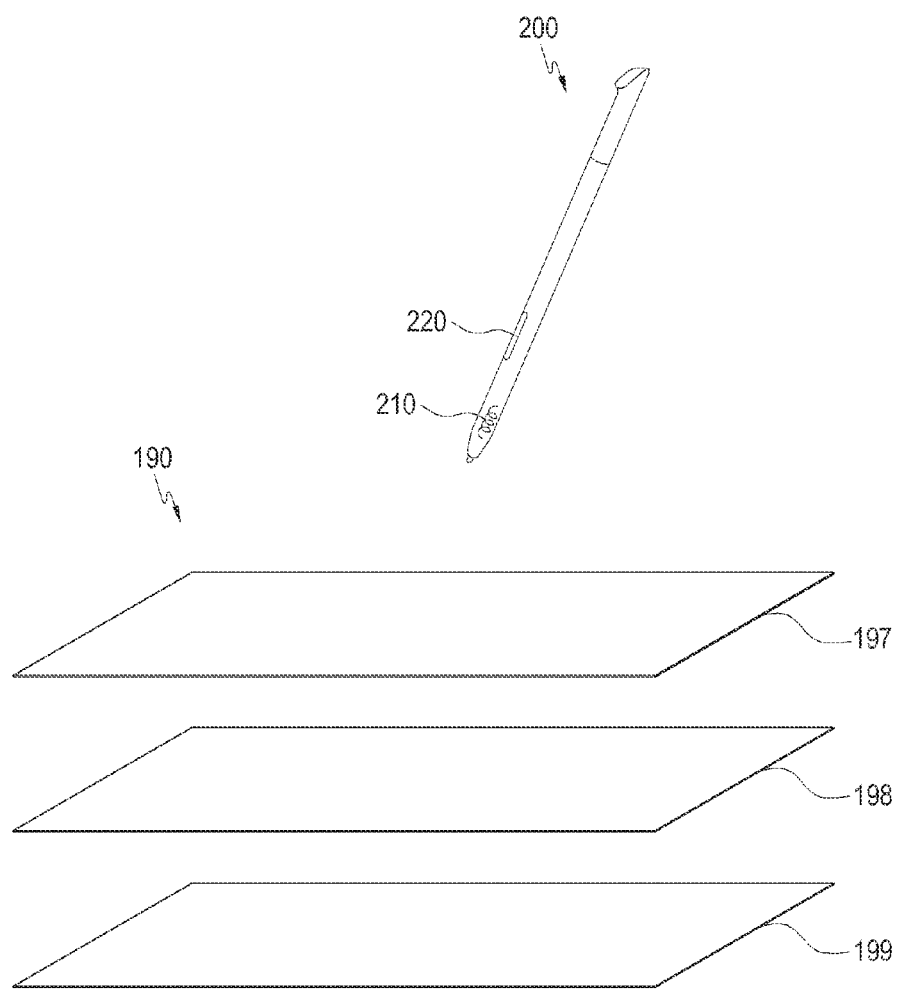
FIG. 4 is an interior sectional view of a hybrid (capacitive+ElectroMagnetic Resonance (EMR)) touch screen according to an exemplary embodiment of the present invention.

An exemplary embodiment of the present invention will be described with the appreciation that the touch screen 190 is a hybrid one operating in both a capacitive scheme and an EMR scheme, as illustrated in FIG. 4, by way of example.

FIG. 4 is an interior sectional view of the touch screen 190 configured into a hybrid (capacitive+ElectroMagnetic Resonance (EMR)) touch screen according to an exemplary embodiment of the present invention.

Referring to FIG. 4, the touch screen 190 includes a display panel 197, a first touch panel 198, and a second touch panel 199. The display panel 197 may be a Liquid Crystal Display (LCD) panel or an Active Matrix Organic Light Emitting Diode (AMOLED) panel, which displays various images according to the operation states of the electronic device 100, application execution, services, and the like.

The first touch panel 198 is a capacitive touch panel formed by coating a thin metal material (e.g., Indium Tin Oxide (ITO)) as a dielectric material on both surfaces of glass so that current may flow on the glass surfaces. When an input means (e.g., a user's finger or a pen) touches a surface of the first touch panel 198, a certain amount of charge migrates to the touched position due to static electricity and the first touch panel 198 detects the touched position by sensing a variation in current caused by the charge migration. The first touch panel 198 is capable of sensing all touches that may generate static electricity and sensing all touches made by the input means, that is, a finger or pen.

The second touch panel 199 is an EMR touch panel including an electromagnetic induction coil sensor (not shown) having a grid structure in which a plurality of loop coils are arranged in first and second directions which are perpendicular to each other, and an electromagnetic signal processor (not shown) for providing an alternating signal having a frequency sequentially to the loop coils of the electromagnetic induction coil sensor. When the touch pen 200 having a built-in resonant circuit is positioned in the vicinity of a loop coil of the second touch panel 199, a magnetic field output from the loop coil generates current based on mutual electromagnetic induction in the resonant circuit of the touch pen 200. Then, an induction field is generated from a coil 210 of the resonant circuit in the touch pen 200 and the second touch panel 199 detects the induction field in loop coils placed in a reception state. Therefore, the second touch panel 199 senses the hovering position and touched position of the touch pen 200 and the height of the touch pen 200 above the electronic device 100. The second touch panel 199 can sense the hovering and touch of any input means that can generate current based on electromagnetic induction. In accordance with an exemplary embodiment of the present invention, it is assumed that the second touch panel 199 is dedicated to sensing the hovering or touch of the touch pen 200. The touch pen 200 may be referred to as an electromagnetic pen or an EMR pen. The touch pen 200 may have a different configuration from a general pen that does not include a resonant circuit, sensed by the first touch panel 198.

The touch screen controller 190 may include a first touch panel controller and a second touch panel controller. The first touch panel controller converts an analog signal corresponding to a sensed finger touch or pen touch, received from the first touch panel 198 to a digital signal (e.g., X, Y and Z coordinates) and provides the digital signal to the controller 110. The second touch panel controller converts an analog signal corresponding to the sensed hovering or touch of the touch pen 200 from the second touch panel 199 to a digital signal and provides the digital signal to the controller 110. The controller 110 may control the display panel 197, the first touch panel 198, and the second touch panel 199 using the digital signals received from the first and second touch panel controllers. For example, the controller 110 may display a screen on the display panel 197 in response to the finger touch or pen touch or in response to the hovering or touch of the touch pen 200.

In accordance with an exemplary embodiment of the present invention, therefore, the first touch panel 198 may sense a user's finger touch or pen touch and the second touch panel 199 may sense the hovering or touch of the touch pen 200 in the electronic device 100. The controller 110 may distinguish the finger touch or pen touch from the hovering or touch of the touch pen 200.

Figure 5:
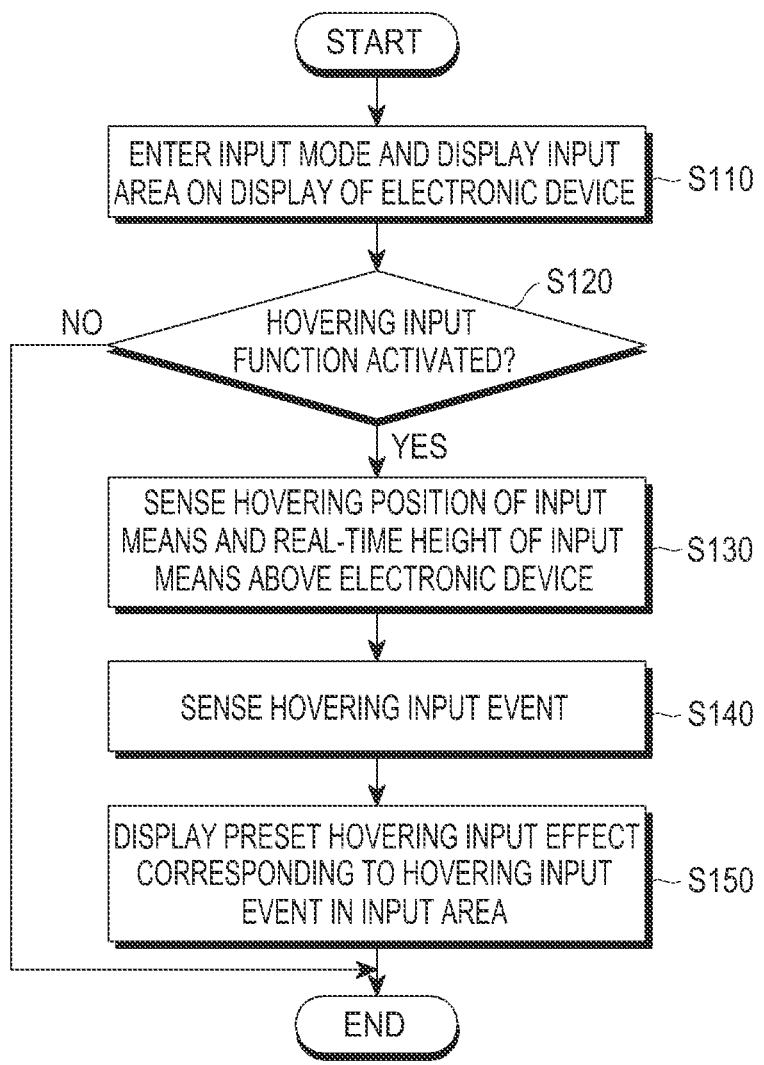
FIG. 5 is a flowchart illustrating a method for controlling an electronic device for providing hovering input effects according to an exemplary embodiment of the present invention.

FIG. 5 is a flowchart illustrating a method for controlling an electronic device for providing hovering input effects according to an exemplary embodiment of the present invention.

Referring to FIG. 5, an input mode is entered and an input area is displayed on the display in step S110. That is, the controller 110 of the electronic device 100 switches the electronic device 100 to the input mode. In the input mode, the controller 110 may receive input data and store the input data in the memory 175 or display the input data on the display 190. The input data may include at least one of text, an image, sound, and a video.

Figure 6:
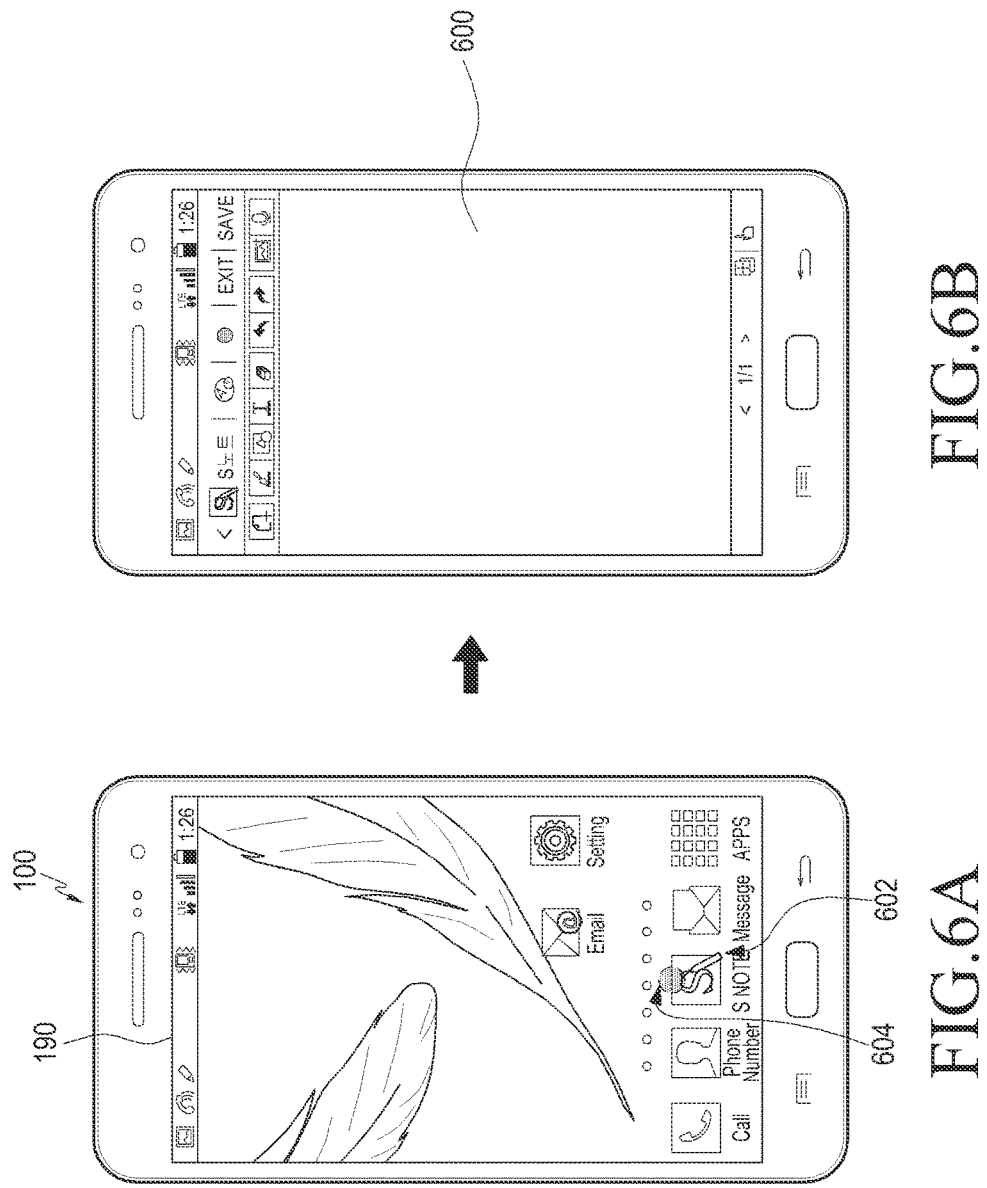
FIGS. 6A and 6B illustrate operations for entering input mode and displaying an input area on a display in the electronic device for providing hovering input effects according to an exemplary embodiment of the present invention.

FIGS. 6A and 6B illustrate operations for entering the input mode and displaying the input area on the display in the electronic device for providing hovering input effects according to the exemplary embodiment of the present invention.

Referring to FIG. 6A, a home screen of the electronic device 100 on the touch screen 190 is illustrated. Icons for executing applications may be displayed on the home screen. For example, an icon 602 for executing a note application may be displayed on the home screen. Upon detection of selection of the icon 602, the controller 110 may execute the note application. The icon 602 for executing the note application may be selected, for example, by a touch 604 on the icon 602. Thus, the controller 110 may detect the touch 604 on the icon 602 and then execute the note application. FIG. 6B illustrates a screen on which the note application is executed. Referring to FIG. 6B, an input area 600 may be displayed on the touch screen 190 according to the note application. The controller 110 may extract data that the user has input with the input means. Herein, the controller 110 may detect a user's touch in the input area 600 displayed on the touch screen 190 and may extract input data applied by the input means. For example, the controller 110 may detect a touch of the input means such as a finger or a pen in the input area 600 and extract input data based on the detected touch. The controller 110 may display the same extracted input data in the input area 600. Further, the controller 110 may store the extracted input data in the memory 175.

Referring again to FIG. 5, it is determined whether a hovering input function has been activated in step S120. That is, the controller 110 determines whether the hovering input function has been activated in the electronic device 100. The hovering input function may be active or inactive in the electronic device 100. Hence, the controller 110 may determine whether the hovering input function has been activated or deactivated. In addition, the controller 110 may activate or deactivate the hovering input function, upon user selection. Or, if a condition is satisfied, the controller 110 may automatically activate or deactivate the hovering input function. If the controller 110 determines that the hovering input function is active in the electronic device 100, it goes to step S130. On the other hand, if the controller 110 determines that the hovering input function is inactive in the electronic device 00, it ends the procedure. The hovering input function refers to a function of displaying a hovering input effect according to the height of the input means above the electronic device in the input area, which will be described below.

When the hovering input function is active, the height of the input means above the electronic device is sensed in step S130. That is, when the controller 110 determines that the hovering input function is active in step S120, the controller 110 senses the hovering position of the input means and the height of the input means above the electronic device.

As described with reference to FIG. 4, the touch screen 190 of the electronic device 100 includes the display panel 197, the first touch panel 198, and the second touch panel 199. The display panel 197 displays a variety of images according to operation states of the electronic device 100, application execution, services. etc.

As described with reference to FIG. 4, the first touch panel 198 may be configured as a capacitive touch panel. When the input means (e.g., a user's finger or a pen) touches on the surface of the first touch panel 198, a certain amount of charge migrates to the touched position due to static electricity and the first touch panel 198 may sense the touched position by recognizing a variation in current caused by the charge migration. The first touch panel 198 is capable of sensing every touch causing static electricity and sensing every touch of the input means such as a finger or a pen.

As described with reference to FIG. 4, the second touch panel 199 may be configured as an EMR touch panel. The second touch panel 199 includes the electromagnetic induction coil sensor and the electromagnetic signal processor. When the touch pen 200 having a resonant circuit and a coil inside it is positioned in the vicinity of the second touch panel 199, the second touch panel 199 may sense the hovering position and touched position of the touch pen 200 and the height of the touch pen 200 above the electronic device 100. The touch pen 200 may also be referred to as an electromagnetic pen or EMR pen.

Accordingly, the controller 110 may sense a finger touch or pen touch through the first touch panel 198 and may sense the hovering or touch of the touch pen 200 through the second touch panel 199. That is, the controller 110 may distinguish the finger touch or the pen touch from the hovering or touch of the touch pen 200.

Figure 7:
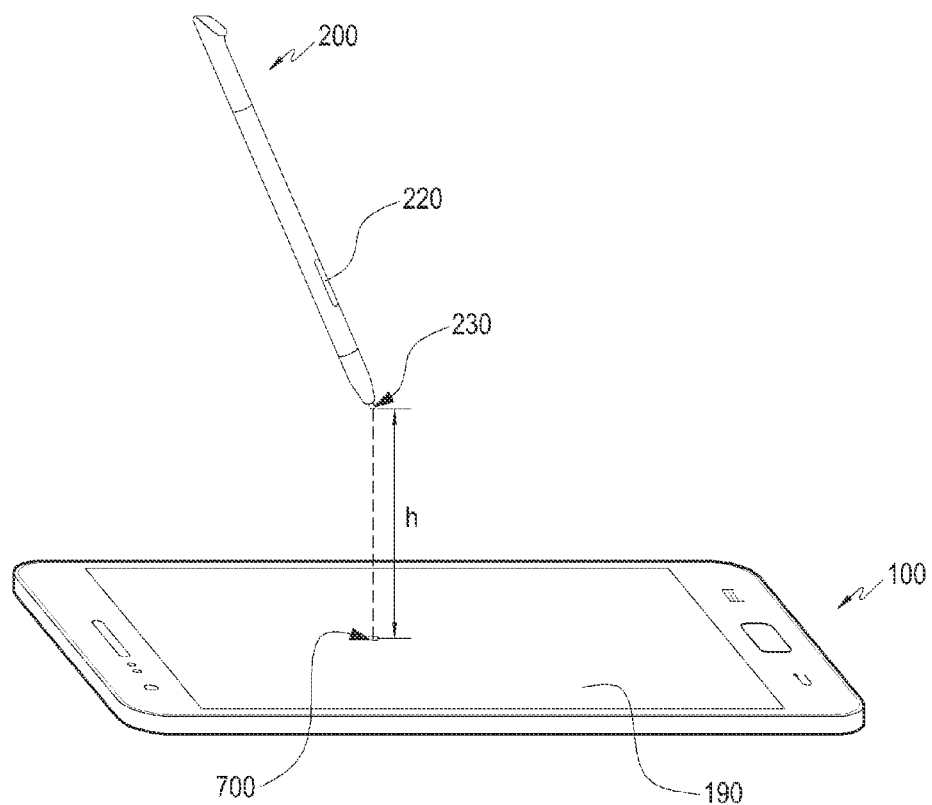
FIG. 7 illustrates an operation for sensing a height of input means above the electronic device in the electronic device for providing hovering input effects according to an exemplary embodiment of the present invention.

FIG. 7 illustrates an operation for sensing the height of an input means above an electronic device in an electronic device for providing hovering input effects according to an exemplary embodiment of the present invention.

Referring to FIG. 7, the electronic device 100 and the touch pen 200 are shown. The controller 110 of the electronic device 100 may sense the hovering position of the input means and the height of the input means above the electronic device 110. The hovering position refers to a point 700 of the display 190 configured into a touch screen, vertically below a pen point 230 of the touch pen 200. The height h of the input means above the electronic device refers to the vertical distance between the pen point 230 of the touch pen 200 and the display 190 configured into a touch screen in the electronic device 100. This vertical distance is thus the shortest distance between the screen and the pen point 230. It will be appreciated that this distance corresponds to the length of a line perpendicular to the flat screen surface, that line extending from point 700 to the pen point 230. The controller 110 may sense the hovering position 700 of the touch pen enclosing a resonant circuit and a coil and the height h of the input means above the electronic device 100 through the second touch panel 199 configured into an EMR touch panel.

Subsequently, a hovering input event is sensed in step S140. That is, the controller 110 of the electronic device 100 may sense the hovering input event. The hovering input event may be one of pressing of the button 220 in the touch pen 200, a tap of the touch pen 200, faster movement of the touch pen 200 than a threshold velocity, a touch on an icon, and the like.

For example, the input means may be the touch pen 200 as illustrated in FIG. 7. The touch pen 200 may include the button 220. The controller 110 of the electronic device 100 may sense pressing of the button 220 of the touch pen 200. That is, the controller 110 may sense a hovering input event corresponding to the pressing of the button 220 of the touch pen 200. For example, when the button 220 is pressed, an electromagnetic signal generated from the touch pen 200 may be changed. The controller 110 of the electronic device 100 may sense the changed electromagnetic signal and thus sense the pressing of the button 220 of the touch pen 200 based on the sensed signal. The changed electromagnetic signal may result from changing an induction field generated from the coil 210 of the touch pen 200 due to the pressing of the button 220. The controller 110 of the electronic device 100 may sense the pressing of the button 220 of the touch pen 200 by sensing the changed electromagnetic signal through the second touch panel 199 being an EMR touch panel.

In another example, the controller 110 of the electronic device 100 may sense a tap of the touch pen 200. That is, the controller 110 may sense a hovering input event corresponding to the tap of the touch pen 200. For example, when the touch pen 200 is tapped, an electromagnetic signal generated from the touch pen 200 may be changed. The controller 110 of the electronic device 100 may sense the changed electromagnetic signal and thus sense the tap of the touch pen 200 based on the sensed signal. The changed electromagnetic signal may result from changing an induction field generated from the coil 210 of the touch pen 200 due to the tap of the button 220. The controller 110 of the electronic device 100 may sense the tap of the button 220 of the touch pen 200 by sensing the changed electromagnetic signal through the second touch panel 199 being an EMR touch panel. Or, when the touch pen 200 is tapped, the hovering position of the pen point 230 of the touch pen 200 may repeatedly change significantly within a threshold distance, faster than a threshold velocity. Thus, when the hovering position repeatedly changes significantly within the threshold distance, faster than the threshold velocity, the controller 110 may determine that the touch pen 200 has been tapped.

In another example, the controller 110 of the electronic device 100 may sense a hovering input event corresponding to faster movement of the touch pen 200 than a threshold velocity. For example, when the touch pen 200 moves faster than the threshold velocity, the hovering position of the touch pen 200 in turn moves faster than a threshold velocity. Thus, the controller 110 of the electronic device 100 may sense the hovering input event corresponding to the faster movement of the touch pen 200 enclosing the resonant circuit and the coil than the threshold velocity through the second touch panel 199 configured into an EMR touch panel.

In a further example, the controller 110 of the electronic device 100 may sense a hovering input event corresponding to a touch on an icon. The controller 110 may detect a touch of the input means such as a finger, a pen, or the touch pen 200 on the touch screen 190. Thus, the controller 110 of the electronic device 100 may sense the hovering input event corresponding to the touch on the icon by detecting the touch on the icon displayed on the touch screen 190.

A hovering input effect corresponding to the hovering input event is displayed in the input area in step S150. That is, the controller 110 may display the hovering input effect corresponding to the hovering input event sensed in step S140 in the input area. The hovering input effect corresponding to the hovering input event may be preset. For example, a brush writing effect of changing a stroke thickness according to a height may be preset as the hovering input effect corresponding to a hovering input event being pressing of the button of the touch pen 200. The hovering input effect may be displayed according to the height sensed in step S130 in the input area. The hovering input effect may be displayed in the input area according to the change of the hovering position sensed in step S130. The hovering input effect may be displayed in the input area according to the height and the change of the hovering position. That is, the hovering input effect may be one of a brush writing effect of changing a stroke thickness according to a height, a chisel effect of changing a carved depth according to a height, a spray effect of changing a sprayed area according to a height, a droplet falling effect of changing a droplet spreading area according to a height, an ink spreading effect of changing an ink spreading area according to a height, a sprinkling effect of changing a sprinkled area according to a height, and a stamp effect corresponding to a height. Thus, in certain embodiments, the displayed hovering input effect may be one of a plurality of different hovering input effects, selected according to the detected height. In certain embodiments, the size of the displayed hovering effect input may be determined (e.g. set) according to the detected height. For example, the displayed size may be arranged to decrease or increase, gradually, continuously, incrementally, or discretely as the height decreases. Thus, when the height of a hovering pen, stylus, finger, or other input means is detected to be a first distance, a hovering input effect (i.e. a graphical element) may be displayed at a first size, and then when the input means is moved closer to the screen such that the height is a second distance, smaller than the first distance, the hovering input effect may be displayed at a second, smaller size. Thus, in certain embodiments, the displayed hover input effect may be reduced in size (in effect, it may become more precise, or more focused beneath the input means tip) as the input means is moved closer to the screen surface, thereby more precisely defining a position on the screen at which contact may eventually be made. Alternatively, the hovering input effect may be arranged to increase in size as the input means is brought closer to the screen, providing the advantage in certain embodiments that the width of a drawn line, or the width/depth of a chisel cut apparently being made in a displayed object may intuitively be arranged to increase as the input means is moved closer to the screen.

FIGS. 8A, 8B, 9A, and 9B illustrate operations for displaying a hovering input effect corresponding to a hovering input event in an input area in the electronic device for providing hovering input effects according to exemplary embodiments of the present invention. For example, the hovering input event may be pressing of the button 220 of the touch pen 200. The hovering input effect corresponding to the pressing of the button 220 of the touch pen 200 being the hovering input event may be the brush writing effect of changing a stroke thickness according to a height. For example, as the height is lower, the stroke thickness may be increased. On the contrary, as the height is higher, the stroke thickness may be increased. Thus, if the pen is moved across the screen and at the same time its height above the screen is gradually decreased, the resultant graphical element "written" or "drawn" on the screen (i.e. the hover effect input) may be a line whose width varies continuously along its length. Advantageously, this input method enables graphic elements to be written, drawn, or otherwise input to the screen that would be impossible to input, or at least would be more difficult to input, with prior art methods.

Figures 8A, 8B:
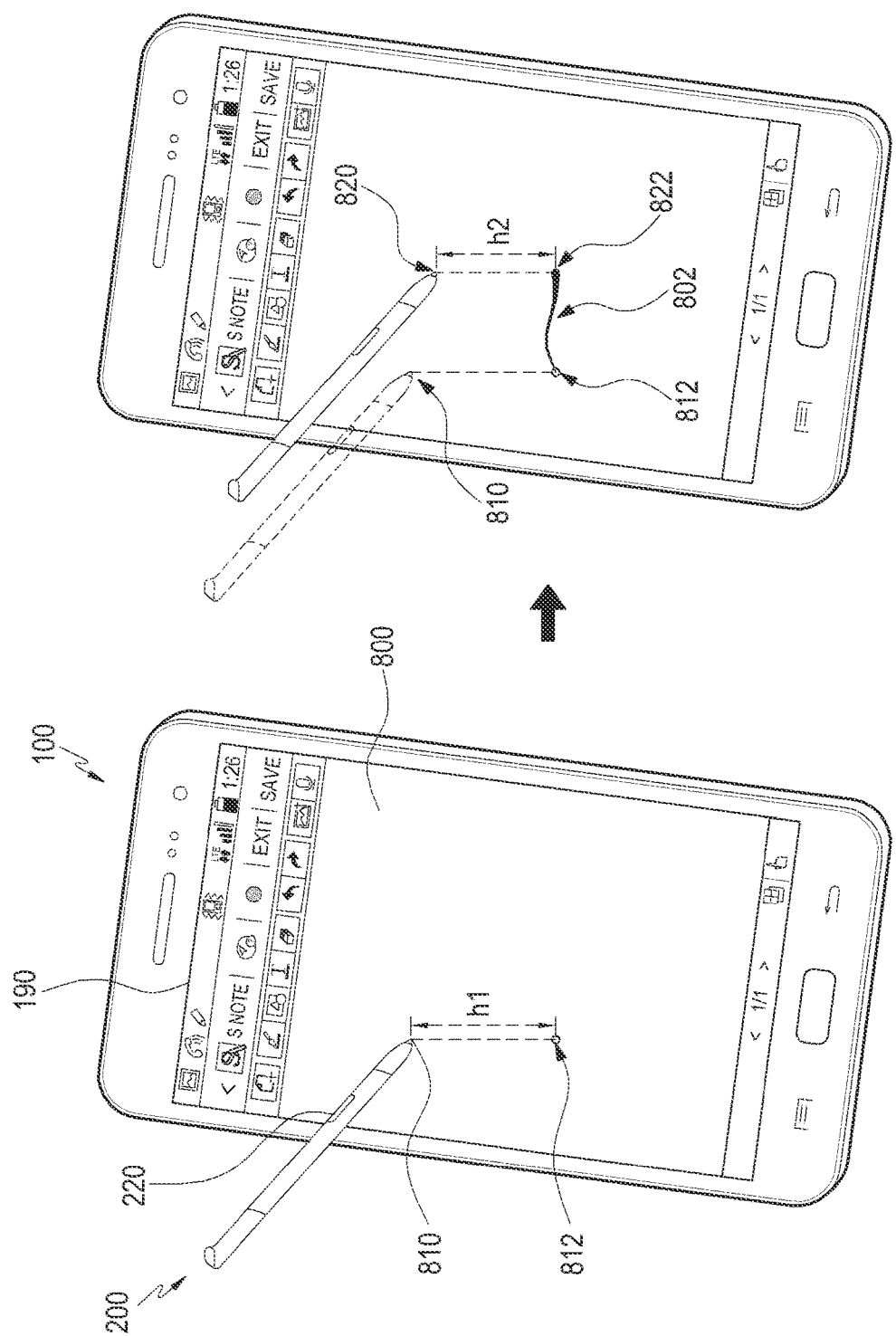

Referring to FIG. 8A, the controller 110 may sense a hovering input event corresponding to pressing of the button 220 of the touch pen 200. The hovering input effect corresponding to the pressing of the button 220 of the touch pen 200 being the hovering input event may be the brush writing effect of changing a stroke thickness according to a height. Therefore, the controller 110 may display the brush writing effect of changing a stroke thickness according to a height in an input area 800 of the display 190. For example, the controller 110 may increase the stroke thickness as the height is lower in the brush writing effect.

As illustrated in FIG. 8A, the controller 110 may sense a hovering position 812 of the touch pen 200 and a height h1 of the input means 810 above the electronic device 100. Then, the controller 110 may display the brush writing effect of increasing the stroke thickness as the height h1 is lower, in the input area 800. Referring to FIG. 8B, the controller 110 may sense a hovering position 822 of the touch pen 200 and a height h2 of input means 820 above the electronic device 100. The height h2 in FIG. 8B is lower than the height h1 in FIG. 8A. Thus, the controller 110 may display a brush writing effect 802 in the input area 800 by increasing the stroke thickness. Referring to FIG. 9A, the controller 110 may sense a hovering position 912 of the touch pen 200 and a height h3 of input means 910 above the electronic device 100. The height h3 in FIG. 9A is lower than the high h2 in FIG. 8B. Thus, the controller 110 may display a brush writing effect 902 with a further increased stroke thickness in an input area 900. Referring to FIG. 9B, the controller 110 may sense a hovering position 922 of the touch pen 200 and a height h4 of input means 920 above the electronic device 100. The height h4 in FIG. 9B is lower than the height h3 in FIG. 9A. Thus, the controller 110 may display a brush writing effect 904 with a further increased stroke thickness in the input area 900.

As noted from FIGS. 8A to 9B, the controller 110 may display the brush writing effect of increasing a stroke thickness with a lower height in an input area. In the exemplary embodiment of the present invention, a hovering input effect corresponding to a hovering input event may be advantageously displayed in the input area. That is, as illustrated in FIGS. 8A to 9B, the brush writing effect of increasing a stroke thickness with a lower height of input means above the electronic device can be displayed in the input area in response to pressing of the button of the touch pen in the exemplary embodiment of the present invention.

Other examples of displaying a hovering input effect corresponding to a hovering input event will be described below with reference to FIGS. 10A to 21C.

FIGS. 10A, 10B, 11A, and 11B illustrate an operation for displaying a chisel effect of changing a carved depth according to a height according to an exemplary embodiment of the present invention.

Figures 10A, 10B:
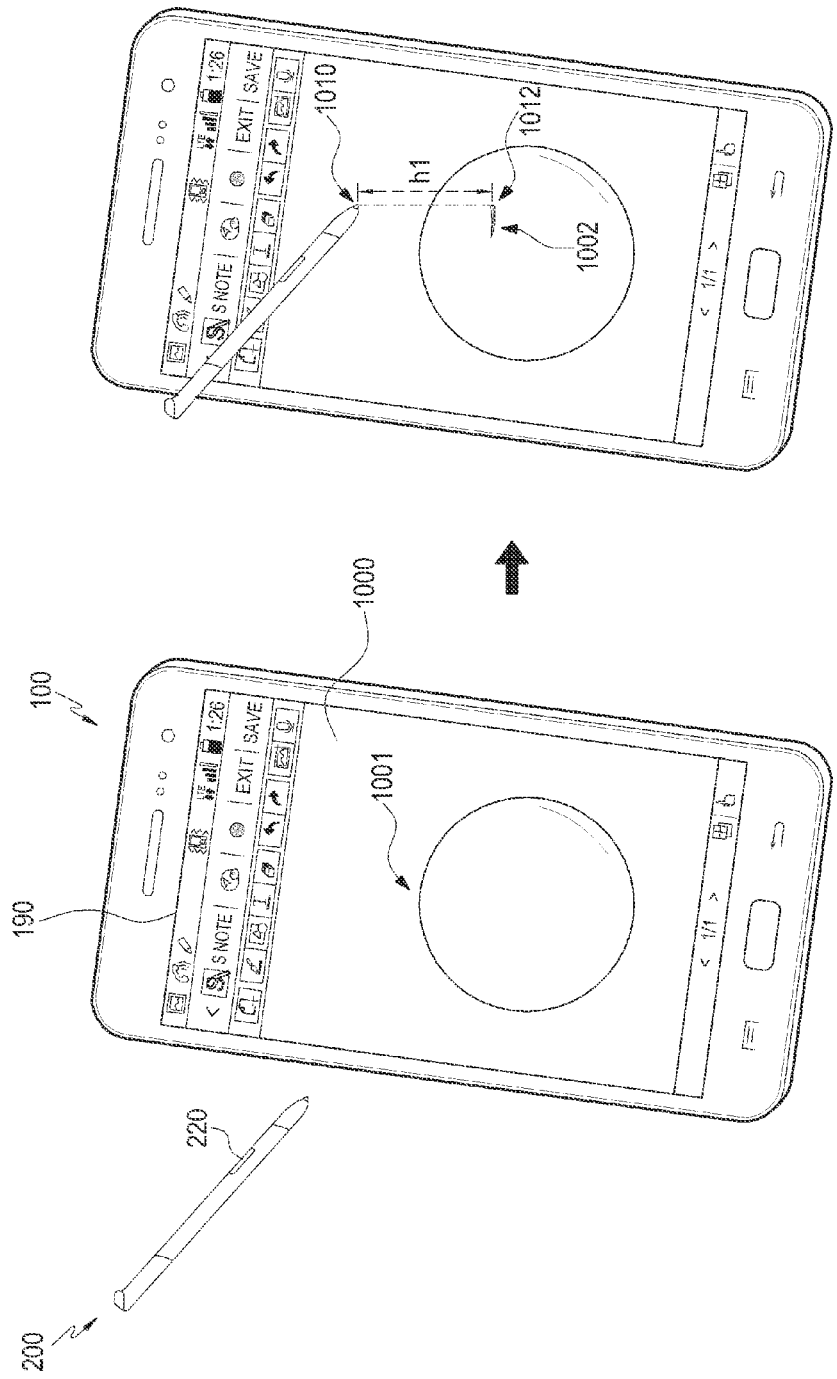
FIGS. 10A and 10B and 11A and 11B illustrate operations for displaying a chisel effect of changing a carved depth according to a height in an input area according to an exemplary embodiment of the present invention.
Figures 11A, 11B:
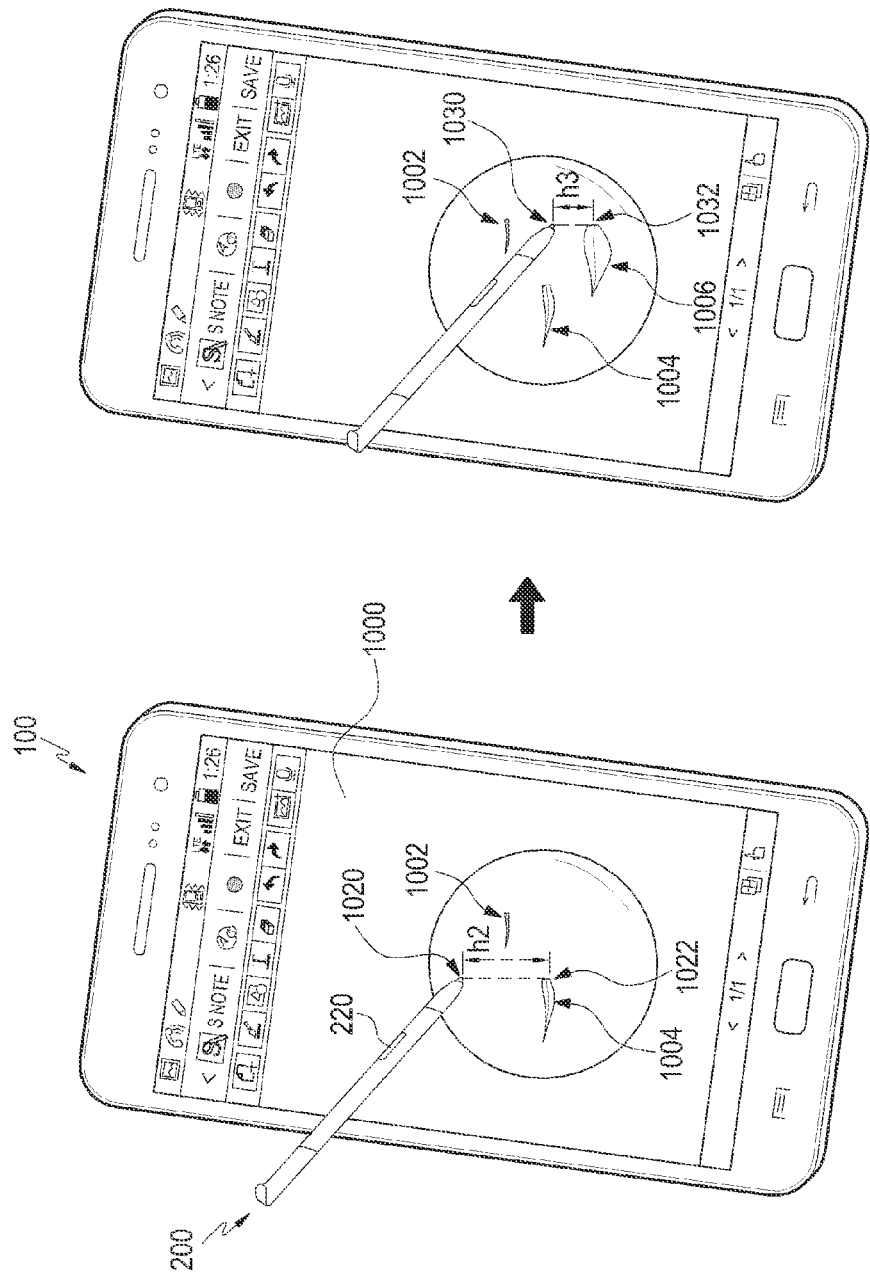

In step S150, the controller 110 may display a hovering input effect corresponding to a hovering input event sensed in step S140 in an input area. For example, the hovering input event may be pressing of the button 220 of the touch pen 200, as illustrated in FIGS. 10A to 11B. The hovering input effect corresponding to the pressing of the button 220 of the touch pen 200 being the hovering input event may be the chisel effect of changing a carved depth according to a height. For example, the carved depth may be larger as the height is smaller. In the opposite case, the carved depth may be larger as the height is higher. Referring to FIG. 10A, the controller 110 of the electronic device 100 may detect a hovering input event corresponding to pressing of the button 220 of the touch pen 200. The hovering input effect corresponding to the pressing of the button 220 of the touch pen 200 being the hovering input event may be the chisel effect of changing a carved depth according to a height. Therefore, the controller 110 may display the chisel effect of changing a carved depth according to a height in an input area 1000 of the display 190. For example, the controller 110 may display a chisel effect of increasing a carved depth with a lower height. Referring to FIG. 10A, a spherical sculpture 1001 is displayed in the input area 1000 in the electronic device 100. Referring to FIG. 10B, the controller 110 may sense a hovering position 1012 of the touch pen 200 and a height h1 of input means 1010 above the electronic device 100. The controller 110 may display in the input area 1000 a chisel effect 1002 of increasing a carved depth as the height h1 is lower. Referring to FIG. 11A, the controller 110 may sense a hovering position 1022 of the touch pen 200 and a height h2 of input means 1020 above the electronic device 100. The height h2 in FIG. 11A is lower than the height h1 in FIG. 10B. Thus, the controller 110 may display a chisel effect 1004 in the input area 1000 by increasing the carved depth due to the lower height h2. Referring to FIG. 11B, the controller 110 may sense a hovering position 1032 of the touch pen 200 and a height h3 of input means 1030 above the electronic device 100. The height h3 in FIG. 11B is lower than the height h2 in FIG. 11A. Thus, the controller 110 may display a chisel effect 1006 in the input area 1000 by further increasing the carved depth due to the lower height h3. As noted from FIGS. 10A to 11B, the controller 110 may display the chisel effect of increasing a carved depth with a lower height in an input area. Therefore, the exemplary embodiment of the present invention is advantageous in that the chisel effect of increasing a carved depth with a lower height of input means above the electronic device is displayed in an input area in response to pressing of the button of the touch pen.

FIGS. 12A, 12B, 13A, and 13B illustrate an operation for displaying a spray effect of changing a sprayed area according to a height according to an exemplary embodiment of the present invention.

Figures 12A, 12B:
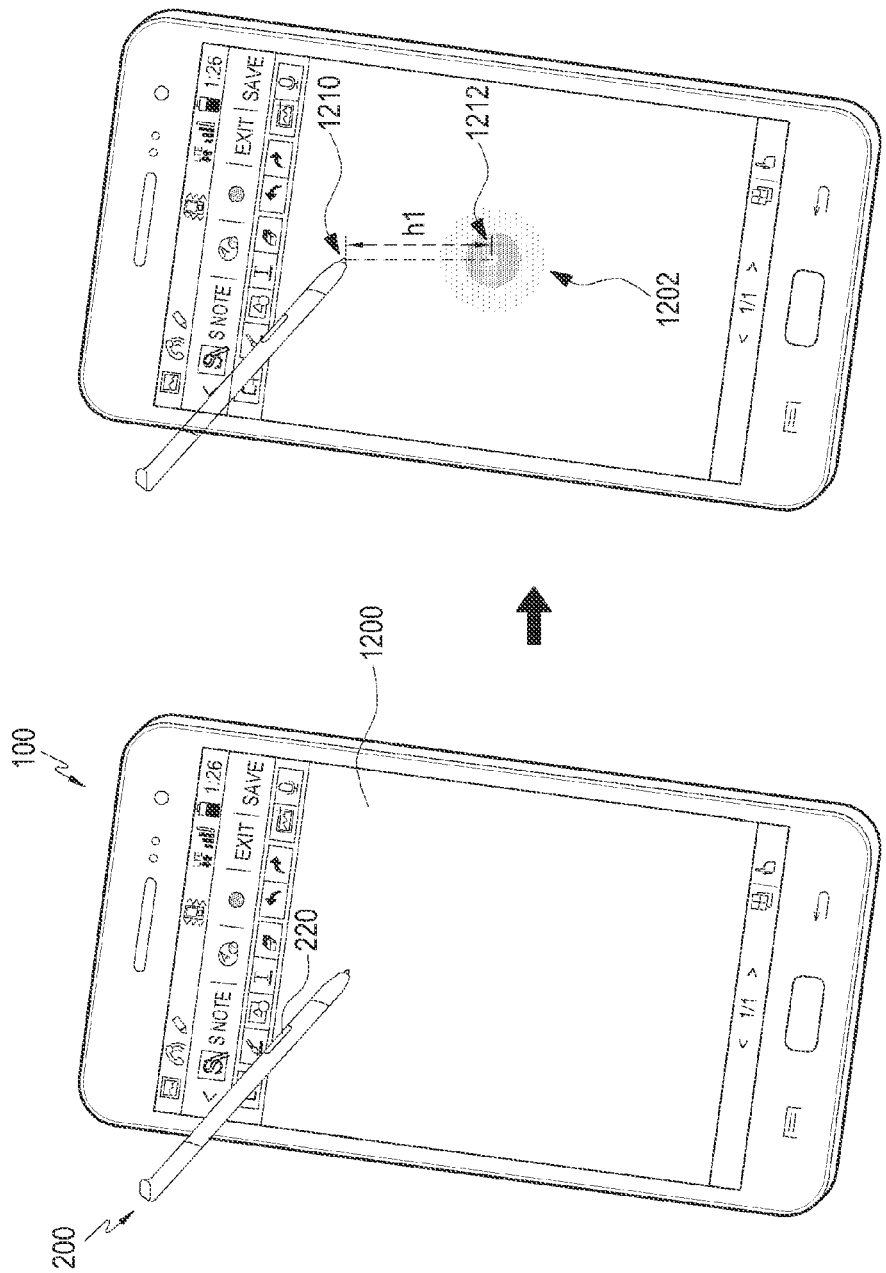

In step S150, the controller 110 may display a hovering input effect corresponding to a hovering input event sensed in step S140 in an input area. For example, the hovering input event may be pressing of the button 220 of the touch pen 200, as illustrated in FIGS. 12A to 13B. The hovering input effect corresponding to the pressing of the button 220 of the touch pen 200 being the hovering input event may be a spray effect of changing a sprayed area according to a height. For example, the sprayed area may be smaller as the height is lower. On the contrary, as the height is higher, the sprayed area may be smaller. Referring to FIG. 12A, the controller 110 of the electronic device 100 may detect a hovering input event corresponding to pressing of the button 220 of the touch pen 200. The hovering input effect corresponding to the pressing of the button 220 of the touch pen 200 being the hovering input event may be the spray effect of changing a sprayed area according to a height. Thus, the controller 110 may display the spray effect of changing a sprayed area according to a height in an input area 1200 of the display 190. For example, the controller 110 may display a spray effect of decreasing a sprayed area with a lower height in the input area. In FIG. 12A, the input area 1200 is displayed in the electronic device 100. Referring to FIG. 12B, the controller 110 may sense a hovering position 1212 of the touch pen 200 and a height h1 of input means 1210 above the electronic device 100. The controller 110 may display in the input area 1200 a spray effect 1202 of decreasing a sprayed area as the height h1 is lower. Referring to FIG. 13A, the controller 110 may sense a hovering position 1222 of the touch pen 200 and a height h2 of input means 1220 above the electronic device 100. The height h2 in FIG. 13A is lower than the height h1 in FIG. 12B. Thus, the controller 110 may display a spray effect 1204 in the input area 1200 by decreasing a sprayed area due to the lower height h2. Referring to FIG. 13B, the controller 110 may sense a hovering position 1232 of the touch pen 200 and a height h3 of input means 1230 above the electronic device 100. The height h3 in FIG. 13B is lower than the height h2 in FIG. 13A. Thus, the controller 110 may display a spray effect 1206 in the input area 1200 by decreasing the sprayed area due to the lower height h3. As noted from FIGS. 12A to 13B, the controller 110 may display the spray effect of decreasing a sprayed area with a lower height in an input area. Therefore, the exemplary embodiment of the present invention is advantageous in that the spray effect of decreasing a sprayed area with a lower height of input means above the electronic device is displayed in an input area in response to pressing of the button of the touch pen.

FIGS. 14A, 14B, 15A, and 15B illustrate operations for displaying a droplet falling effect of changing a droplet spreading area according to a height according to an exemplary embodiment of the present invention.

In step S150, the controller 110 may display a hovering input effect corresponding to a hovering input event sensed in step S140 in an input area. For example, the hovering input event may be a tap of the touch pen 200, as illustrated in FIGS. 14A to 15B. The hovering input effect corresponding to the tap of the touch pen 200 being the hovering input event may be the droplet falling effect of changing a spreading area according to a height. For example, the spreading area may be smaller as the height is lower. On the contrary, as the height is higher, the spreading area may be smaller. Referring to FIG. 14A, the controller 110 of the electronic device 100 may detect a hovering input event corresponding to a tap of the touch pen 200. The hovering input effect corresponding to the tap of the touch pen 200 being the hovering input event may be the droplet falling effect of changing a spreading area according to a height. Thus, the controller 110 may display the droplet falling effect of changing a spreading area according to a height in an input area 1400 of the display 190. For example, the controller 110 may display a droplet falling effect of decreasing a spreading area with a lower height in the input area. In FIG. 14A, the input area 1400 is displayed in the electronic device 100. Referring to FIG. 14B, the controller 110 may sense a hovering position 1412 of the touch pen 200 and a height h1 of input means 1410 above the electronic device 100. The controller 110 may display in the input area 1400 a droplet falling effect 1402 of decreasing a spreading area as the height h1 is lower. Referring to FIG. 15A, the controller 110 may sense a hovering position 1422 of the touch pen 200 and a height h2 of input means 1420 above the electronic device 100. The height h2 in FIG. 15A is lower than the height h1 in FIG. 14B. Thus, the controller 110 may display a droplet falling effect 1404 in the input area 1400 by decreasing the spreading area due to the lower height h2, as illustrated in FIG. 15A. Referring to FIG. 15B, the controller 110 may sense a hovering position 1432 of the touch pen 200 and a height h3 of input means 1430 above the electronic device 100. The height h3 in FIG. 15B is lower than the height h2 in FIG. 15A. Thus, the controller 110 may display a droplet falling effect 1406 in the input area 1400 by further decreasing the spreading area due to the lower height h3. As noted from FIGS. 14A to 15B, the controller 110 may display the droplet falling of decreasing a spreading area with a lower height in an input area. Therefore, the exemplary embodiment of the present invention is advantageous in that the droplet falling of decreasing a spreading area with a lower height of input means above the electronic device is displayed in an input area in response to a tap of the touch pen.

FIGS. 16A and 16B illustrate operations for displaying a droplet falling effect of changing a splashed area according to a height according to an exemplary embodiment of the present invention.

In step S150, the controller 110 may display a hovering input effect corresponding to a hovering input event sensed in step S140 in an input area. For example, the hovering input event may be a tap of the touch pen 200, as illustrated in FIGS. 16A and 16B. The hovering input effect corresponding to the tap of the touch pen 200 being the hovering input event may be the droplet falling effect of changing a splashed area according to a height. For example, the splashed area may be smaller as the height is lower. In contrast, as the height is higher, the splashed area may be smaller. Referring to FIG. 16A, the controller 110 of the electronic device 100 may detect a hovering input event corresponding to a tap of the touch pen 200. The hovering input effect corresponding to the tap of the touch pen 200 being the hovering input event may be the droplet falling effect of changing a splashed area according to a height. Thus, the controller 110 may display the droplet falling effect of changing a splashed area according to a height in an input area 1600 of the display 190. For example, the controller 110 may display in the input area a droplet falling effect of decreasing a splashed area as a height is lower. In FIG. 16A, the input area 1600 is displayed in the electronic device 100. The controller 110 may sense a hovering position 1612 of the touch pen 200 and a height h1 of input means 1610 above the electronic device 100. The controller 110 may display in the input area 1600 a droplet falling effect 1602 of decreasing a splashed area as the height h1 is lower. Referring to FIG. 16B, the controller 110 may sense a hovering position 1622 of the touch pen 200 and a height h2 of input means 1620 above the electronic device 100. The height h2 in FIG. 16B is higher than the height h1 in FIG. 16A. Thus, the controller 110 may display a droplet falling effect 1604 in the input area 1600 by increasing the splashed area due to the higher height h2, as illustrated in FIG. 16B. As noted from FIGS. 16A and 16B, the controller 110 may display the droplet falling effect of decreasing a splashed area with a lower height in an input area. Therefore, the exemplary embodiment of the present invention is advantageous in that the droplet falling of decreasing a splashed area with a lower height of input means above the electronic device is displayed in an input area in response to a tap of the touch pen.

Figures 17A, 17B:
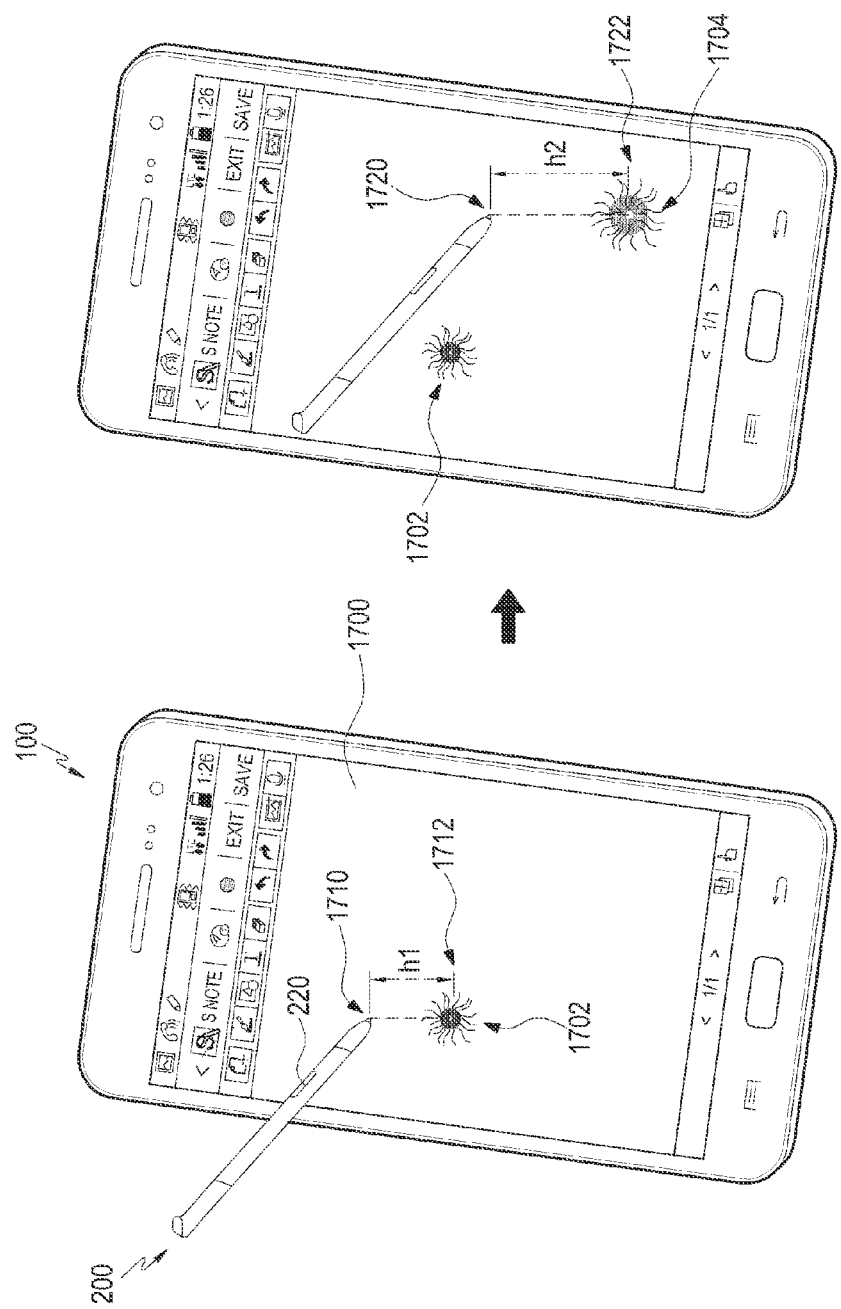
FIGS. 17A and 17B illustrates operations for displaying an ink spreading effect of changing an ink spreading area according to a height in an input area according to an exemplary embodiment of the present invention.

FIGS. 17A and 17B illustrate operations for displaying an ink spreading effect of changing a spreading area according to a height according to an exemplary embodiment of the present invention.

In step S150, the controller 110 may display a hovering input effect corresponding to a hovering input event sensed in step S140 in an input area. For example, the hovering input event may be pressing of the button 220 of the touch pen 200, as illustrated in FIGS. 17A and 17B. The hovering input effect corresponding to the pressing of the button 220 of the touch pen 200 being the hovering input event may be the ink spreading effect of changing an ink spreading area according to a height. For example, the ink spreading area may be smaller as the height is lower. On the contrary, as the height is higher, the ink spreading area may be larger. Referring to FIG. 17A, the controller 110 of the electronic device 100 may detect a hovering input event corresponding to pressing of the button 220 of the touch pen 200. The hovering input effect corresponding to the pressing of the button 220 of the touch pen 200 being the hovering input event may be the ink spreading effect of changing a spreading area according to a height. Thus, the controller 110 may display the ink spreading effect of changing a spreading area according to a height in an input area 1700 of the display 190. For example, the controller 110 may display an ink spreading effect of decreasing a spreading area with a lower height in the input area. In FIG. 17A, the input area 1700 is displayed in the electronic device 100. The controller 110 may sense a hovering position 1712 of the touch pen 200 and a height h1 of input means 1710 above the electronic device 100. The controller 110 may display in the input area 1700 an ink spreading effect 1702 of decreasing a spreading area as the height h1 is lower. Referring to FIG. 17B, the controller 110 may sense a hovering position 1722 of the touch pen 200 and a height h2 of input means 1720 above the electronic device 100. The height h2 in FIG. 17B is higher than the height h1 in FIG. 17A. Thus, the controller 110 may display an ink spreading effect 1704 in the input area 1700 by increasing the spreading area due to the higher height h2, as illustrated in FIG. 17B. As noted from FIGS. 17A and 17B, the controller 110 may display the ink spreading effect of decreasing a spreading area with a lower height in an input area. Therefore, the exemplary embodiment of the present invention is advantageous in that the ink spreading effect of decreasing a spreading area with a lower height of input means above the electronic device is displayed in an input area in response to pressing of the button of the touch pen.

FIGS. 18A, 18B, 19A, and 19B illustrate displaying a sprinkling effect of changing a sprinkling degree according to a height according to an exemplary embodiment of the present invention.

Figures 19A, 19B:
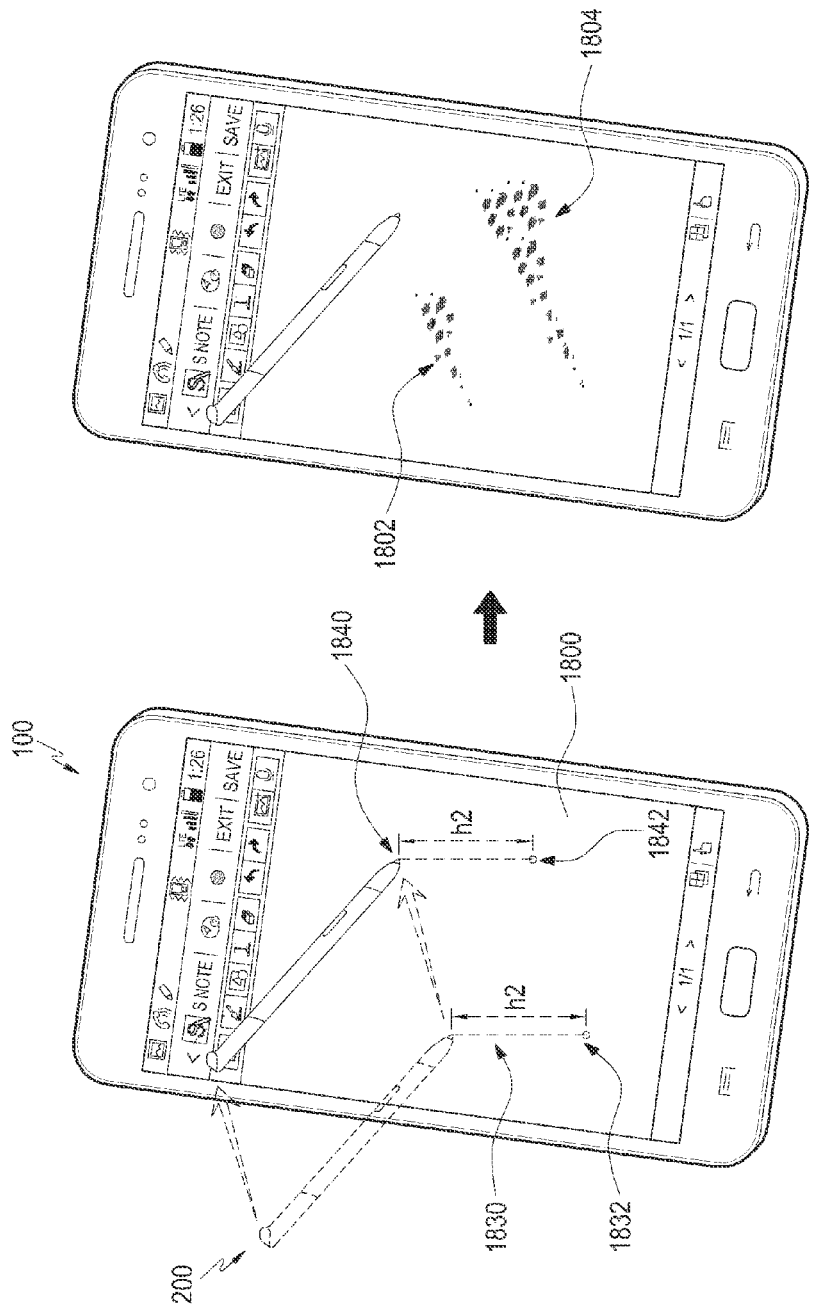

In step S150, the controller 110 may display a hovering input effect corresponding to a hovering input event sensed in step S140 in an input area. For example, the hovering input event may be pressing of the button 220 of the touch pen 200, as illustrated in FIGS. 18A to 19B. The hovering input effect corresponding to the pressing of the button 220 of the touch pen 200 being the hovering input event may be the sprinkling effect of changing a sprinkling degree according to a height. For example, the sprinkling degree may be smaller as the height is lower. On the contrary, as the height is higher, the sprinkling degree may be larger. While a sprinkling effect of decreasing a sprinkling degree with a lower height is displayed in an input area in FIG. 18A, it is also possible to display a sprinkling effect of decreasing a sprinkling degree with a higher height. Referring to FIG. 18A, the controller 110 of the electronic device 100 may detect a hovering input event corresponding to pressing of the button 220 of the touch pen 200. The hovering input effect corresponding to the pressing of the button 220 of the touch pen 200 being the hovering input event may be the sprinkling effect of changing a sprinkling degree according to a height. Thus, the controller 110 may display the sprinkling effect of changing a scattering area according to a height in an input area 1800 of the display 190. For example, the controller 110 may display a sprinkling effect of decreasing a sprinkling degree with a lower height in the input area, as illustrated in FIG. 18A. The controller 110 may sense a hovering position 1812 of the touch pen 200 and a height h1 of input means 1810 above the electronic device 100. In addition, the controller 110 may sense movement of the hovering position along with movement of the touch pen 200. As illustrated in FIG. 18A, as the touch pen 200 moves, the controller 110 may sense that the first hovering position 1812 has been changed to a second hovering position 1822 while the height h1 of the input means 1820 above the electronic device 100 remains the same. The controller 110 may display a sprinkling effect 1802 in the input area 1800 according to the height h1 along with the shift of the hovering position, as illustrated in FIG. 18B. The controller 110 may display the sprinkling effect of decreasing a sprinkling degree with a lower height in the input area. Referring to FIG. 19A, the controller 110 may sense a hovering position 1832 of the touch pen 200 and a height h2 of input means 1830 above the electronic device 100. The height h2 in FIG. 19A is higher than the height h1 in FIG. 18A. Thus, the controller 110 may display a sprinkling effect 1804 in the input area 1800 by increasing a sprinkling degree due to the higher height h2, as illustrated in FIG. 19A. That is, the controller 110 may sense the hovering position 1832 of the touch pen 200 and the height h2 of the input means 1830 above the electronic device 100. In addition, the controller 110 may sense the shift of the hovering position along with the movement of the touch pen 200. As illustrated in FIG. 19A, the controller 110 may sense the shift of the first hovering position 1832 to a second hovering position 1842 while the height h2 of the input means 1840 above the electronic device 100 remains the same along with the movement of the touch pen 200. The height h2 in FIG. 19A is higher than the height h1 in FIG. 18A. Therefore, the controller 110 may display a sprinkling effect 1804 in the input area 1800 by increasing the sprinkling degree due to the higher height h2, as illustrated in FIG. 19B. Therefore, as noted from FIGS. 18A to 19B, the controller 110 may display the sprinkling effect of decreasing a sprinkling degree with a lower height in an input area. Therefore, the exemplary embodiment of the present invention is advantageous in that the sprinkling effect of decreasing a sprinkling degree with a lower height of input means above the electronic device is displayed in an input area in response to pressing of the button of the touch pen.

Figure 20B:
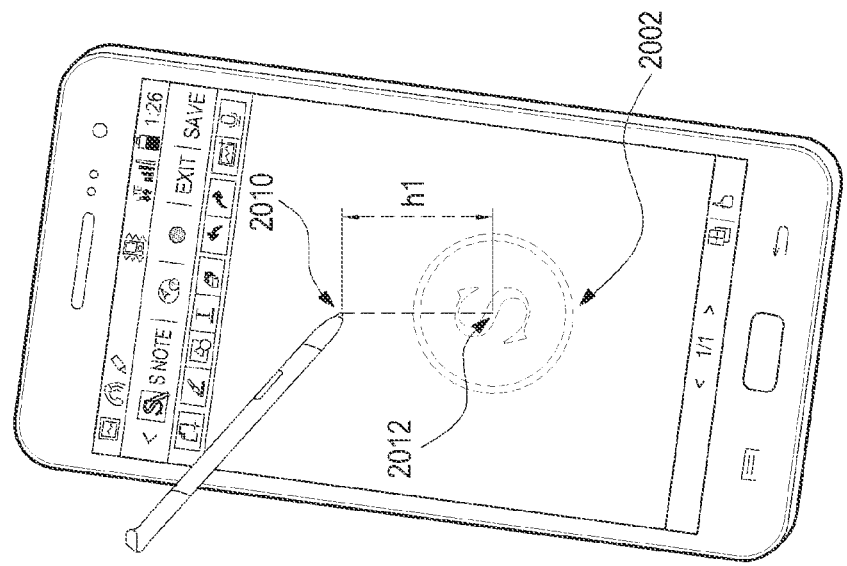
Figure 20A:
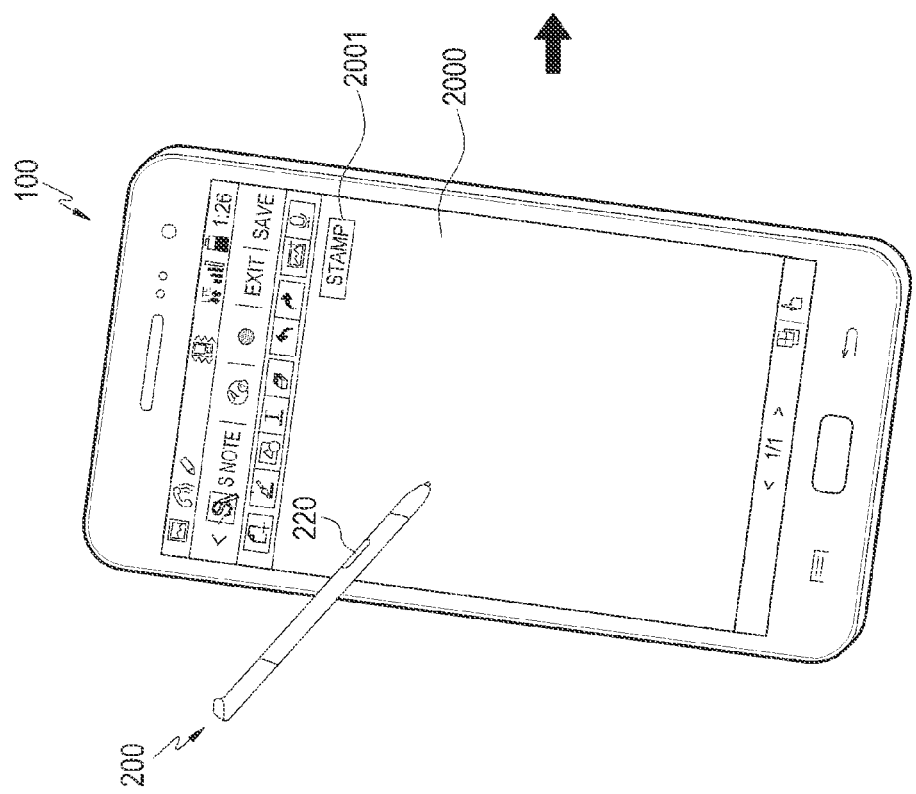

FIGS. 20A, 20B, 21A, and 21C illustrate operations for displaying a stamp effect based on a height in an input area according to an exemplary embodiment of the present invention. For example, a hovering input event may be a touch on an icon. The icon may be preset and displayed on the touch screen 190. For example, an icon 2001 may be preset to 'STAMP' as illustrated in FIG. 20A. A hovering input effect corresponding to the touch on the icon 2001 being the hovering input event may be the stamp effect displayed according to a height. For example, a stamp size may be smaller as the height is lower. On the contrary, as the height is higher, the stamp size may be smaller. While a stamp effect of decreasing a stamp size with a lower height is displayed in an input area in FIGS. 20A to 21C, it is also possible to display a stamp effect of decreasing a stamp size with a higher height in the input area. Referring to FIG. 20A, the controller 110 of the electronic device 100 may detect a hovering input event corresponding to a touch on the 'STAMP' icon 2001. The preset hovering input effect corresponding to the touch on the 'STAMP' icon 2001 being the hovering input event may be a stamp effect displayed according to a height. Thus, the controller 110 may display the stamp effect according to a height in an input area 2000 of the display 190. For example, the controller 110 may display a stamp effect of decreasing a stamp size with a lower height in the input area. That is, as illustrated in FIG. 20B, the controller 110 may sense a hovering position 2012 of the touch pen 200 and a height h1 of input means 2010 above the electronic device 100. Then, the controller 110 may display a stamp effect 2002 in the input area 2000 according to the height h1. Referring to FIG. 21A, the controller 110 may sense a hovering position 2022 of the touch pen 200 and a height h2 of input means 2020 above the electronic device 100. The height h2 in FIG. 21A is lower than the height h1 in FIG. 20B. Thus, the controller 110 may display a stamp effect 2004 in the input area 2000 by decreasing the stamp size due to the smaller height h2, as illustrated in FIG. 21A. Referring to FIG. 21B, the controller 110 may sense a hovering position 2032 of the touch pen 200 and a height h3 of input means 2030 above the electronic device 100. The height h3 in FIG. 21B is lower than the height h2 in FIG. 21A. Therefore, the controller 110 may display a stamp effect 2006 in the input area 2000 by further decreasing the stamp size due to the lower height h3. Referring to FIG. 21C, the controller 110 may sense a touch of the touch pen 200 on the display 190 of the electronic device 100. That is, the controller 110 may sense that the touch pen 200 has touched the display 190 of the electronic device 100. The touched state of the touch pen 200 on the display 190 is distinguished from a hovering state of the touch pen 200 above the display 190. In FIG. 21C, the height of the input means above the electronic device is 0 and thus the height in FIG. 21C is lower than the height h3 in FIG. 21B. Therefore, the controller 110 may display a stamp effect 2008 in the input area 2000 by further decreasing the stamp size due to the lower height, as illustrated in FIG. 21C. Before the touch pen 200 touches the display 190, the controller 110 may display the stamp effect in a dotted line as illustrated in FIGS. 20B, 21A and 21B, whereas when the touch pen 200 touches the display 190, the controller 110 may display the stamp effect 2006 in a solid line as illustrated in FIG. 21C in order to represent a stamp based on the touch. Therefore, the exemplary embodiment of the present invention is advantageous in that a hovering input effect corresponding to a hovering input event may be displayed in an input area. That is, as illustrated in FIGS. 20A to 21C, a stamp effect of decreasing a stamp size with a lower height of input means above the electronic device can be displayed in an input area in response to a touch on an icon in the exemplary embodiment of the present invention.

Figure 22:
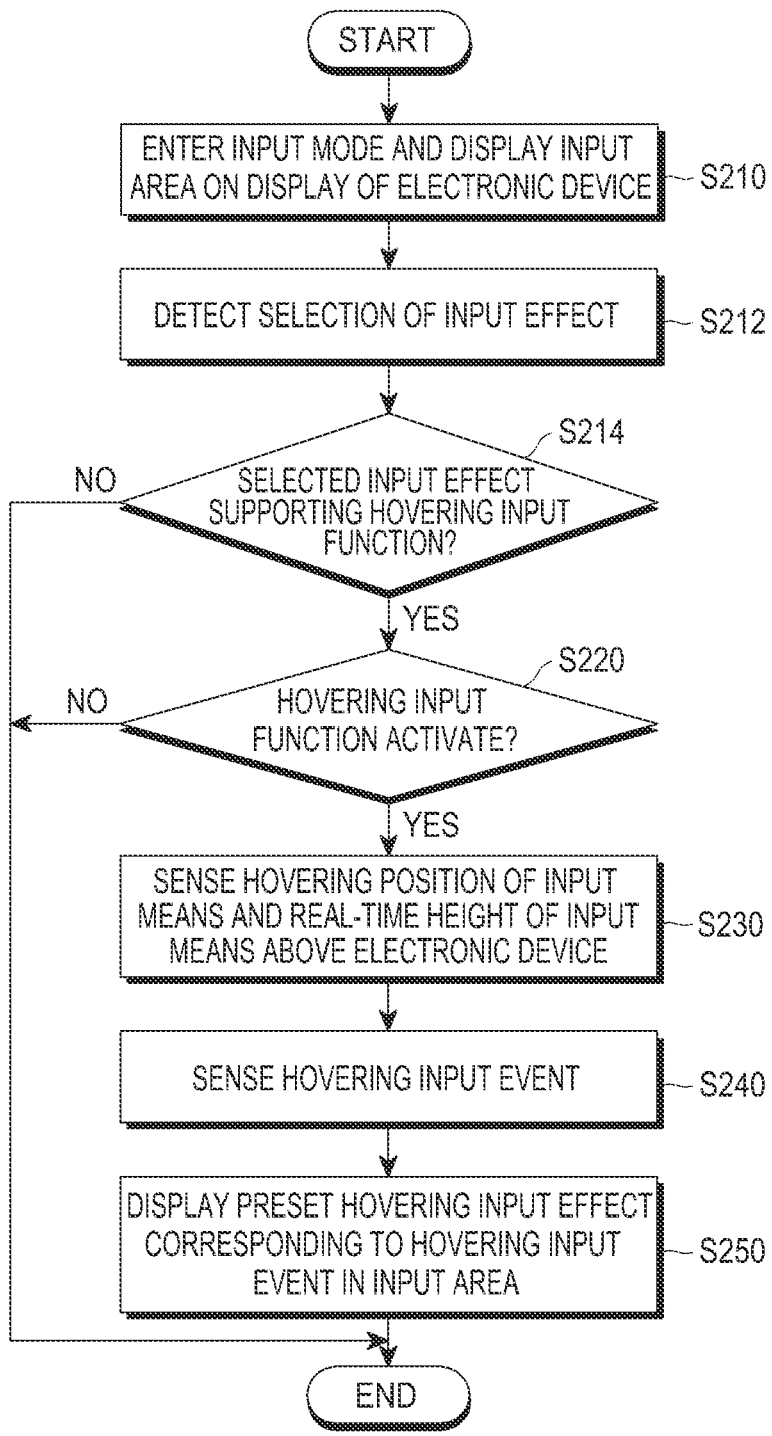
FIG. 22 is a flowchart illustrating a method for controlling an electronic device for providing hovering input effects according to an exemplary embodiment of the present invention.
Figure 23:
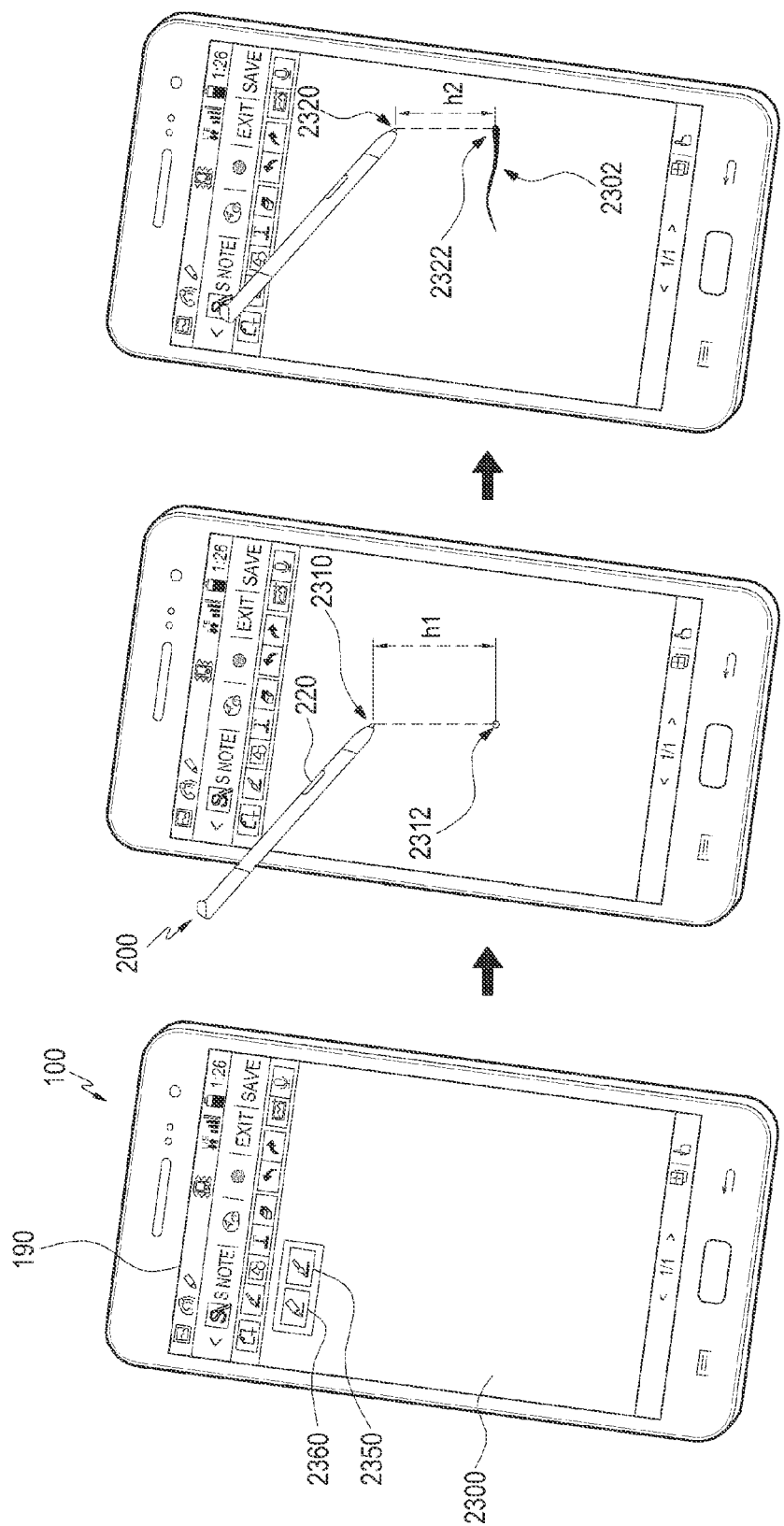
FIGS. 23A to 23C illustrate operations for determining whether a selected input effect supports a hovering input function and displaying a hovering input effect corresponding to a hovering input event in an input area according to a height in the electronic device for providing hovering input effects according to an exemplary embodiment of the present invention.

FIG. 22 is a flowchart illustrating an operation for controlling an electronic device that provides hovering input effects according to an exemplary embodiment of the present invention, and FIGS. 23A to 23C illustrate operations for determining whether a selected input effect supports a hovering input function and displaying a hovering input effect corresponding to a hovering input event according to a height in an input area in the electronic device for providing hovering input effects according to an exemplary embodiment of the present invention.

The operation illustrated in FIG. 22 is substantially the same as that illustrated in FIG. 5 except for steps S212 and S214. Hence, the same steps as illustrated in FIG. 5 will be described briefly below.

Referring to FIG. 22, in the method for controlling an electronic device that provides hovering input effects according to an exemplary embodiment of the present invention, an input mode is entered and an input area is displayed on the display of the electronic device in step S210. The controller 110 switches the electronic device 100 to the input mode.

FIG. 23A illustrates an operation for entering the input mode and displaying the input area on the display in the electronic device that provides hovering input effects according to another exemplary embodiment of the present invention.

Referring to FIG. 23A, as a note application is executed, the electronic device 100 enters the input mode and displays an input area 2300 on the display 190. The controller 110 may extract data that the user has input to the input area 2300 with input means such as a finger or a pen and may display the input data on the display 190 or store the input data in the memory 175.

Subsequently, a selected input effect is detected in step S212. The controller 110 may detect the selected input effect. Input effects refer to various effects displayed in the input area. For example, the input effect may be any of a pen writing effect, a brush writing effect, a spray effect, etc. Therefore, the controller 110 may detect an input effect selected from among the afore-described input effects or other input effects. For example, when the input effects are represented in the form of icons on the touch screen 190, the controller 110 may detect a selected input effect by sensing a touch on an icon. Referring to FIG. 23A, an icon 2360 representing the pen writing effect and an icon 2350 representing the brush writing effect may be displayed on the touch screen 190. The controller 110 may sense touches on the icons 2350 and 2360, thereby detecting selection of the pen writing effect and the brush writing effect.

It is determined whether the selected input effect supports a hovering input function in step S214. That is, the controller 110 may determine whether the input effect selected in step S212 supports the hovering input function. The input effect may or may not support the hovering input function. Information indicating whether the input effects support the hovering input function may be stored in advance in the memory 175. For example, only the brush writing effect between the pen writing effect and the brush writing effect may support the hovering input function. The controller 110 may determine whether the input effect selected in step S212 is the brush writing effect supporting the hovering input function. For example, upon detection of a touch on the icon 2350 representing the brush writing effect as illustrated in FIG. 23A, the controller 110 may determine that the selected brush writing effect supports the hovering input function. If the input effect supports the hovering input function, the controller 110 goes to step S220. If the input effect does not support the hovering input function, the controller 110 ends the procedure.

It is determined whether the hovering input function is active in step S220. That is, the controller 110 determines whether the hovering input function is active in the electronic device 100. The hovering input function may be activated or deactivated in the electronic device 100. Therefore, the controller 110 may determine whether the hovering input function has been activated or deactivated. If the controller 110 determines that the hovering input function is active in the electronic device 100, the controller 110 proceeds to step S230. If the controller 110 determines that the hovering input function is inactive in the electronic device 100, the controller 110 ends the procedure.

When the hovering input function is active, a hovering position and a height of an input means above the electronic device are sensed in step S230. If the controller 110 determines that the hovering input function is active in step S220, the controller 110 senses the hovering position and the height of the input means above the electronic device.

Subsequently, a hovering input event is sensed in step S240. The controller 110 of the electronic device 100 may sense a hovering input event. The hovering input event may be one of pressing of the button in the touch pen, a tap of the touch pen, faster movement of the touch pen than a threshold velocity, and a touch on an icon. For example, the input means may be the touch pen 200, as illustrated in FIG. 23B. The touch pen 200 may include the button 220. The controller 110 of the electronic device 100 may sense pressing of the button 220 of the touch pen 200. That is, the controller 110 may sense a hovering input event corresponding to the pressing of the button 220 formed in the touch pen 200.

A hovering input effect corresponding to the hovering input event is displayed in the input area in step S250. The controller 110 may display a hovering input effect corresponding to the hovering input event sensed in step S240 in the input area. The hovering input effect corresponding to the hovering input event may be preset. For example, the hovering input effect corresponding to the hovering input event being pressing of the button in the touch pen may be preset to the brush writing effect of changing a stroke thickness according to a height. The hovering input effect may be displayed in the input area according to the height sensed in step S230. In addition, the hovering input effect may be displayed in the input area according to a change in the hovering position sensed in step S230. The hovering input effect may be displayed in the input area according to the height and the change of the hovering position. For example, the hovering input event may be pressing of the button 220 of the touch pen 200. The hovering input effect corresponding to the pressing of the button 220 of the touch pen 200 as the hovering input event may be the brush writing effect of changing a stroke thickness according to a height. For example, as the height is lower, the stroke thickness may be increased. On the contrary, as the height is higher, the stroke thickness may be increased. Referring to FIG. 23B, the controller 110 of the electronic device 100 may detect a hovering input event corresponding to pressing of the button 220 of the touch pen 200. The hovering input effect corresponding to the hovering input event being the pressing of the button 220 of the touch pen 200 may be the brush writing effect of changing a stroke thickness according to a height. Therefore, the controller 110 may display the brush writing effect of changing a stroke thickness according to a height in the input area 2300 of the display 190. For example, the controller 110 may display a brush writing effect of increasing the stroke thickness as the height is lower in the input area. That is, as illustrated in FIG. 23B, the controller 110 may sense a hovering position 2312 of the touch pen 200 and a height h1 of input means 2310 above the electronic device. The controller 110 may display a brush writing effect of increasing a stroke thickness as the height h1 is lower in the input area 2300.

Referring to FIG. 23C, the controller 110 may sense a hovering position 2322 of the touch pen 200 and a height h2 of input means 2320 above the electronic device 100. Since the height h2 in FIG. 23C is lower than the height h1 in FIG. 23B, the controller 110 may display a brush writing effect 2302 in the input area 2300 by increasing the stroke thickness due to the lower height h2, as illustrated in FIG. 23C. That is, as noted from FIGS. 23B and 23C, the controller 110 may display the brush writing effect of increasing a stroke thickness with a lower height in an input area.

In the exemplary embodiment of the present invention, it is determined whether a selected input effect supports a hovering input function in step S212 and S214. If the selected input effect supports the hovering input function, a hovering input effect corresponding to the hovering input event is advantageously displayed in an input area according to a height. That is, the exemplary embodiment of the present invention is advantageous in that it is determined whether a selected input effect supports a hovering input function and a hovering input effect corresponding to the hovering input event is displayed in an input area according to a height.

Figure 24:
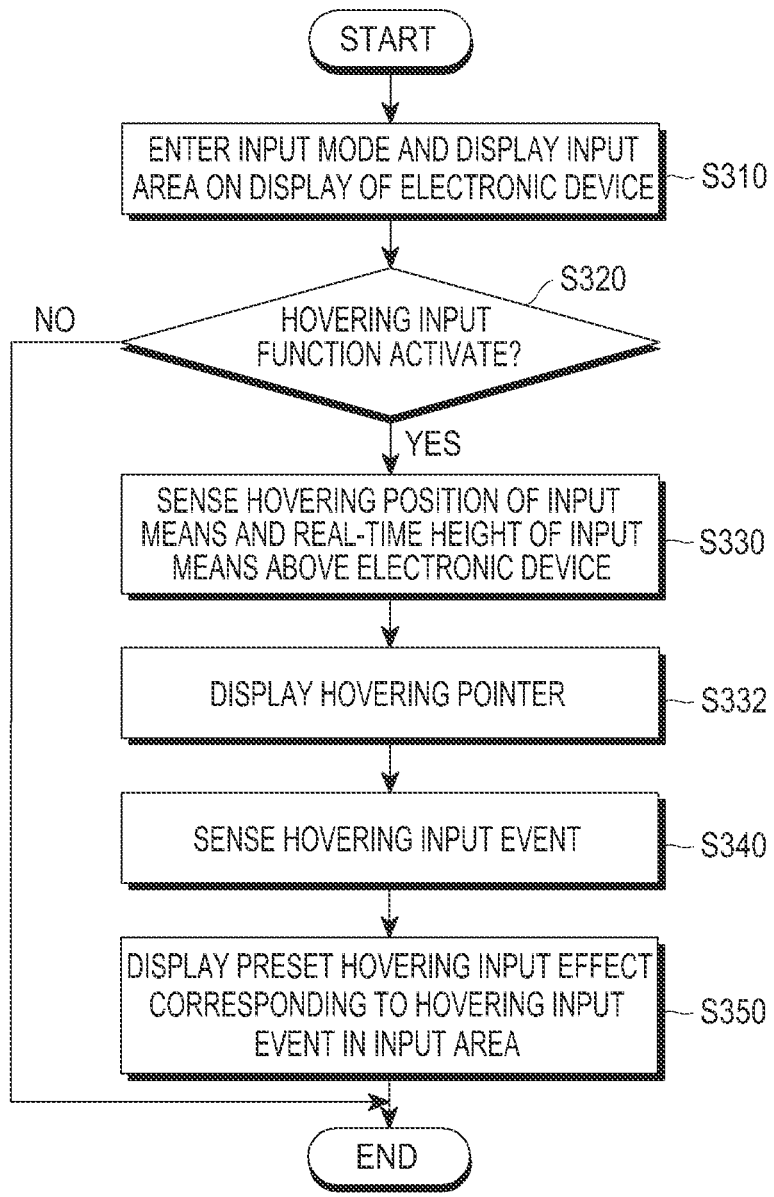
FIG. 24 is a flowchart illustrating a method for controlling an electronic device for providing hovering input effects according to a further exemplary embodiment of the present invention.

FIG. 24 is a flowchart illustrating a method for controlling an electronic device for providing hovering input effects according to an exemplary embodiment of the present invention, and FIGS. 25A to 25C, 26A, and 26B illustrate operations for displaying a hovering pointer on a display and displaying a hovering input effect corresponding to a hovering input event according to a height in an input area in an electronic device for providing hovering input effects according to an exemplary embodiment of the present invention.

The operation illustrated in FIG. 24 is substantially the same as that illustrated in FIG. 5 except for step S332. Hence, the same steps as illustrated in FIG. 5 will be described briefly below.

Referring to FIG. 24, in the method for controlling an electronic device that provides hovering input effects according to an exemplary embodiment of the present invention, an input mode is entered and an input area is displayed on the display of the electronic device in step S310. That is, the controller 110 switches the electronic device 100 to the input mode.

Figure 25C:
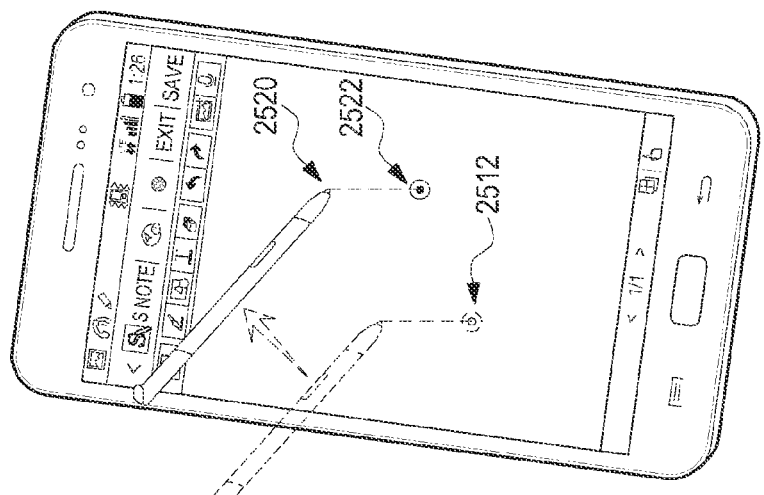
FIGS. 25A to 25C, 26A, and 26B illustrate operations for displaying a hovering pointer on a display and displaying a hovering input effect corresponding to a hovering input event in an input area according to a height in the electronic device for providing hovering input effects according to the further exemplary embodiment of the present invention.
Figure 25B:
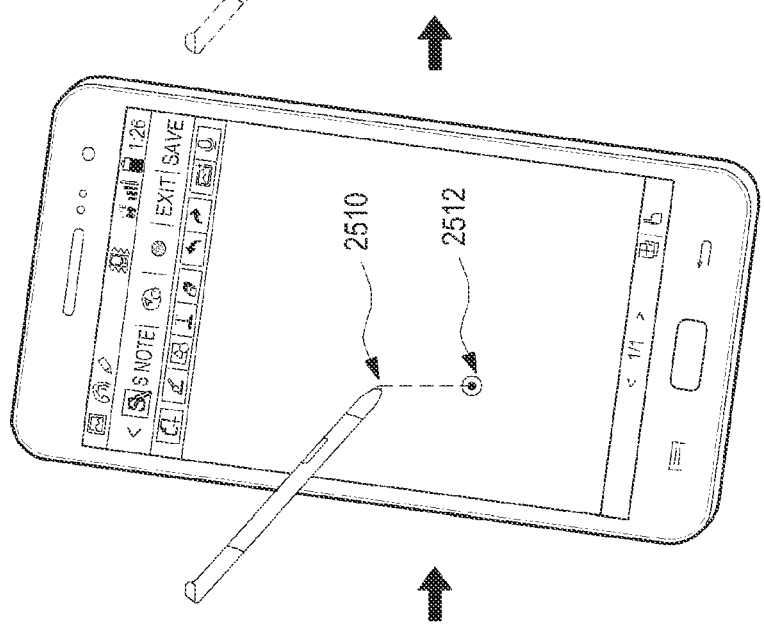
Figure 25A:
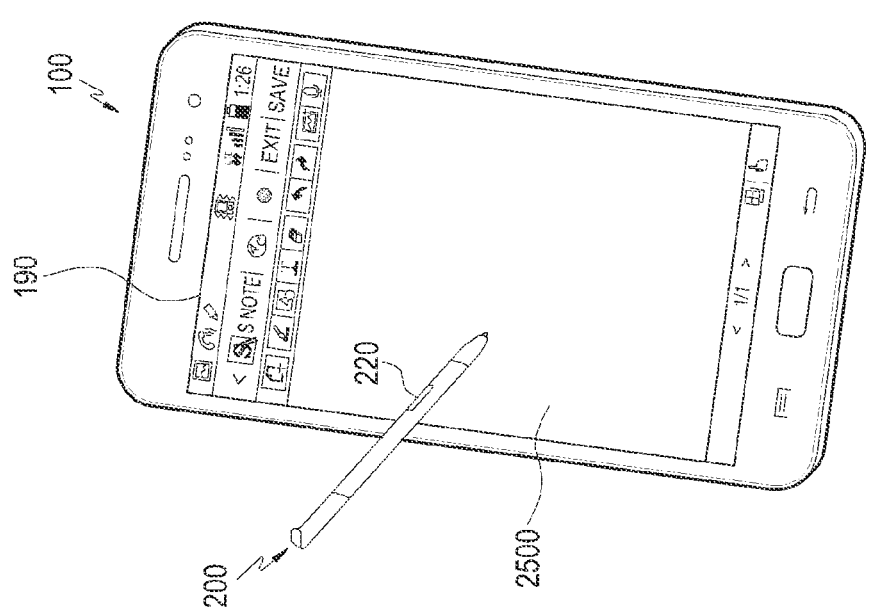

FIG. 25A illustrates an operation for entering an input mode and displaying an input area on a display in an electronic device that provides hovering input effects according to an exemplary embodiment of the present invention.

Referring to FIG. 25A, as a note application is executed, the electronic device 100 enters the input mode and displays an input area 2500 on the display 190. The controller 110 may extract data that the user has input to the input area 2500 with input means such as a finger or a pen and may display the input data on the display 190 or store the input data in the memory 175.

In step S320, it is determined whether a hovering input function is active. That is, the controller 110 determines whether the hovering input function is active in the electronic device 100. The hovering input function may be activated or deactivated in the electronic device 100. Therefore, the controller 110 may determine whether the hovering input function has been activated or deactivated. If the controller 110 determines that the hovering input function is active in the electronic device 100, the controller 110 proceeds to step S330. If the controller 110 determines that the hovering input function is inactive in the electronic device 100, the controller 110 ends the procedure.

When the hovering input function is active, a hovering position and a height of the input means above the electronic device are sensed in step S330. That is, if the controller 110 determines that the hovering input function is active in step S320, the controller 110 senses the hovering position and the height of the input means above the electronic device.

A hovering pointer is displayed on the display in step S332. The controller 110 may display the hovering point on the display 190. The hovering pointer may be displayed at the hovering position sensed in step S330. For example, the controller 110 may display a hovering pointer 2512 at the hovering position 2510, as illustrated in FIG. 25B. When the hovering position is changed due to movement of the input means, the controller 110 may display the hovering pointer at the changed position. For example, when the first hovering pointer 2512 has moved to the position of a second hovering position 2520 along with movement of the input means 200, the first hovering pointer 2512 may be changed to the second hovering pointer 2522, as illustrated in FIG. 25C.

Figures 26A, 26B:
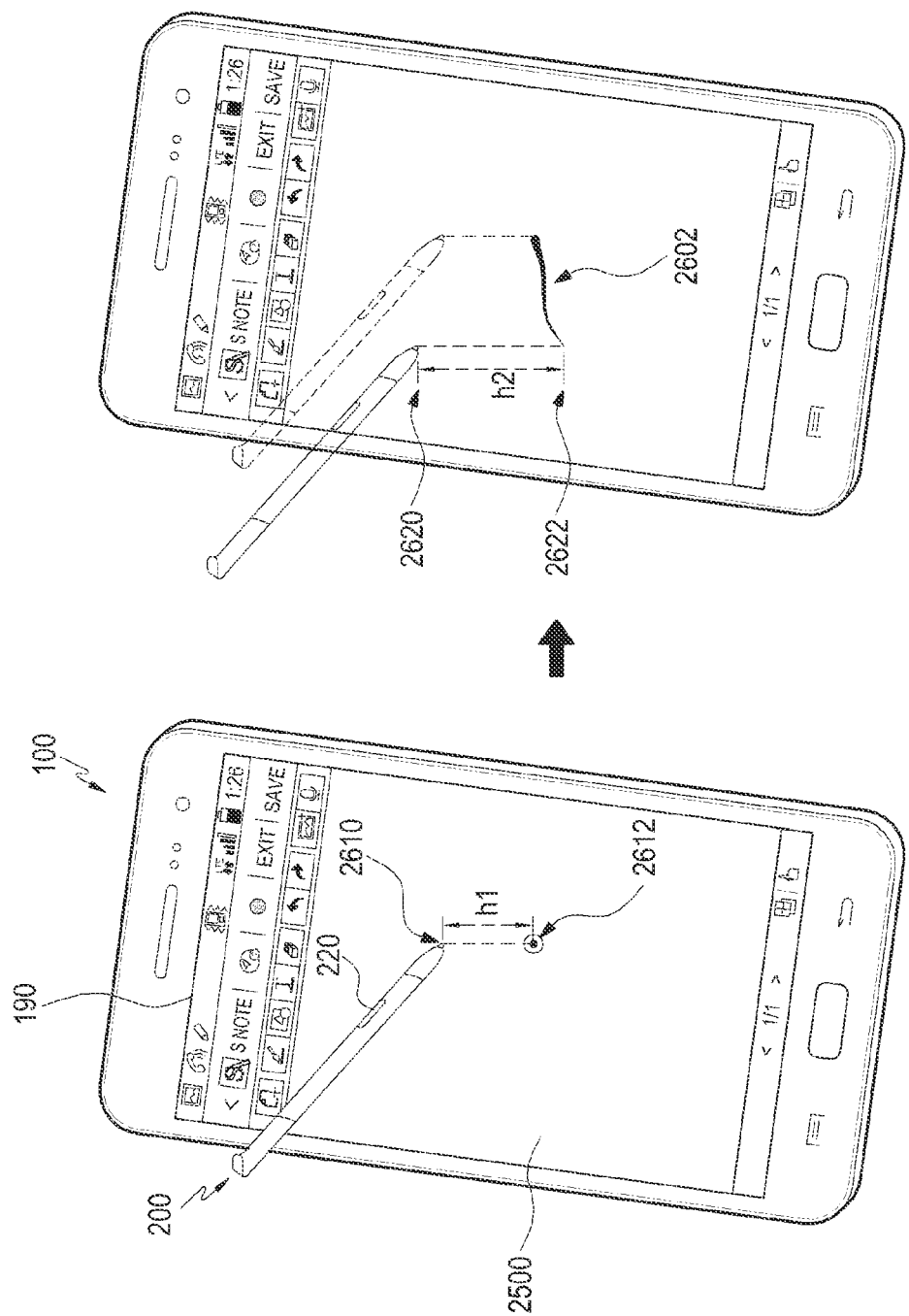

Subsequently, a hovering input event is sensed in step S340. That is, the controller 110 of the electronic device 100 may sense a hovering input event. The hovering input event may be one of pressing of the button in the touch pen, a tap of the touch pen, faster movement of the touch pen than a threshold velocity, and a touch on an icon. For example, the input means may be the touch pen 200, as illustrated in FIG. 26A. The touch pen 200 may include the button 220. The controller 110 of the electronic device 100 may sense pressing of the button 220 of the touch pen 200. That is, the controller 110 may sense a hovering input event corresponding to the pressing of the button 220 formed in the touch pen 200.

A hovering input effect corresponding to the hovering input event is displayed in the input area in step S350. The controller 110 may display a hovering input effect corresponding to the hovering input event sensed in step S340 in the input area. The hovering input effect corresponding to the hovering input event may be preset. For example, the hovering input effect corresponding to the hovering input event being pressing of the button in the touch pen may be preset to the brush writing effect of changing a stroke thickness according to a height. The hovering input effect may be displayed in the input area according to the height sensed in step S330. In addition, the hovering input effect may be displayed in the input area according to a change in the hovering position sensed in step S330. The hovering input effect may be displayed in the input area according to the height and the change of the hovering position. For example, the hovering input event may be pressing of the button 220 in the touch pen 200. The hovering input effect corresponding to the pressing of the button 220 of the touch pen 200 being the hovering input event may be the brush writing effect of changing a stroke thickness according to a height. For example, as the height is lower, the stroke thickness may be increased. On the contrary, as the height is higher, the stroke thickness may be increased. Referring to FIG. 26A, the controller 110 of the electronic device 100 may detect a hovering input event corresponding to pressing of the button 220 of the touch pen 200. A hovering input effect corresponding to the hovering input event which is the pressing of the button 220 of the touch pen 200 may be the brush writing effect of changing a stroke thickness according to a height. Thus, the controller 110 may display the brush writing effect of changing a stroke thickness according to a height in an input area 2500 of the display 190. For example, the controller 110 may display a brush writing effect of increasing the stroke thickness as the height is lower in the input area. That is, as illustrated in FIG. 26A, the controller 110 may sense a hovering position 2612 of the touch pen 200 and a height h1 of input means 2610 above the electronic device. The controller 110 may display a brush writing effect of increasing a stroke thickness as the height h1 is lower in the input area 2500. Referring to FIG. 26B, the controller 110 may sense a hovering position 2622 of the touch pen 200 and a height h2 of input means 2620 above the electronic device 100. Since the height h2 in FIG. 26B is higher than the height h1 in FIG. 26A, the controller 110 may display a brush writing effect 2602 in the input area 2500 by decreasing the stroke thickness due to the higher height h2, as illustrated in FIG. 26B. That is, as noted from FIGS. 26A and 26B, the controller 110 may display the brush writing effect of increasing a stroke thickness with a lower height in an input area.

In exemplary embodiments of the present invention, a hovering pointer is displayed on the display and a hovering input effect corresponding to a hovering input event is advantageously displayed in an input area according to a height. Therefore, the user can change the position of the input means, viewing the hovering pointer. In addition, since the user can view the hovering pointer on the display, the user can readily determine the hovering position of the input means in the exemplary embodiment of the present invention.

As is apparent from the above description of the electronic device for providing hovering input effects and the method for controlling the same according to the present invention, a finger touch or pen touch can be distinguished from the hovering or touch of a touch pen.

A hovering input effect corresponding to a hovering input event can be displayed in an input area.

A brush writing effect of changing a stroke thickness according to a height of input means from the electronic device can be displayed in an input area in response to a hovering input event.

A chisel effect of changing a carved depth according to a height of input means from the electronic device can be displayed in an input area in response to a hovering input event.

A spray effect of changing a spray area according to a height of input means from the electronic device can be displayed in an input area in response to a hovering input event.

A droplet falling effect of changing a spreading degree according to a height of input means from the electronic device can be displayed in an input area in response to a hovering input event.

A droplet falling effect of changing a splashing degree according to a height of input means from the electronic device can be displayed in an input area in response to a hovering input event.

An ink spreading effect of changing a spreading degree according to a height of input means from the electronic device can be displayed in an input area in response to a hovering input event.

A sprinkling effect of changing a sprinkling degree according to a height of input means from the electronic device can be displayed in an input area in response to a hovering input event.

A stamp effect corresponding to a height of input means from the electronic device can be displayed in an input area in response to a hovering input event.

It is determined whether a selected input effect supports a hovering input function. If the selected input effect supports the hovering input function, a hovering input effect corresponding to a hovering input event can be displayed in an input area according to a height.

A hovering pointer is displayed on the display and a hovering input effect corresponding to a hovering input event can be displayed in an input area according to a height.

It will be understood that exemplary embodiments of the present invention can be implemented in hardware, software, or a combination thereof. The software may be stored in a volatile or non-volatile memory device like a ROM irrespective of whether data is deletable or rewritable, in a memory like a RAM, a memory chip, a device, or an integrated circuit, or in a storage medium to which data can be recorded optically or magnetically and from which data can be read by a machine (e.g. a computer), such as a CD, a DVD, a magnetic disk, or a magnetic tape. Further, exemplary embodiments of the present invention can be implemented in a computer or portable terminal that has a controller and a memory, and the memory is an example of a machine-readable storage medium suitable for storing a program or programs including commands to implement exemplary embodiments of the present invention. Accordingly, the present invention includes a program having a code for implementing the apparatuses or methods defined by the claims and a storage medium readable by a machine that stores the program. The program can be transferred electronically through a medium such as a communication signal transmitted via a wired or wireless connection, which and the equivalents of which are included in the present invention.

The electronic device can receive the program from a program providing device connected by cable or wirelessly and store it. The program providing device may include a program including commands to implement exemplary embodiments of the present invention, a memory for storing information required for the exemplary embodiments of the present invention, a communication module for communicating with the electronic device by cable or wirelessly, and a controller for transmitting the program to the electronic device automatically or upon request of the electronic device.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling an electronic device including a display for providing hovering input effects, the method comprising:
sensing a hovering input on the display of the electronic device;
sensing a first height of an input means above the display at a first position of the display;
displaying a first hovering input effect corresponding to the first height of the input means at the first position of the display;
sensing a second height of the input means above the display as the input means moves across the display to a second position of the display, the second height being different from the first height; and
displaying a second hovering input effect corresponding to the second height of the input means at the second position of the display,
wherein a magnitude of the second hovering input effect gradually changes from the first position of the display to the second position of the display according to a change in height of the input means from the first height to the second height.

2. The method of claim 1, further comprising determining whether a function for sensing the first and second hovering inputs is active.

3. The method of claim 1, wherein the input means comprises a touch pen or a finger.

4. The method of claim 3, wherein the touch pen includes a coil and the display includes a touch screen, and
wherein the touch screen includes an ElectroMagnetic Resonance (EMR) touch panel for sensing the touch pen based on EMR.

5. The method of claim 4, wherein the touch screen further includes a capacitive touch panel and at least one processor distinguishes a touch on the capacitive touch panel from hovering over or a touch on the EMR touch panel.

6. The method of claim 1, wherein the input means comprises a touch pen and the hovering input comprises at least one of pressing of a button of the touch pen, a tap of the touch pen, faster movement of the touch pen than a threshold velocity, and a touch on an icon.

7. The method of claim 1, wherein each of the first and the second hovering input effect comprises at least one of a brush writing effect of changing a stroke thickness, a chisel effect of changing a carved depth, a spray effect of changing a spray area, a droplet falling effect of changing a spreading area, an ink spreading effect of changing a spreading area, and a stamp effect.

8. The method of claim 1, further comprising:
   detecting selection of the first hovering input effect; and
   determining whether the selected first hovering input effect supports an input function for sensing the hovering input.

9. The method of claim 1, further comprising displaying a pointer for the input means on the display.

10. An electronic device for providing hovering input effects, the electronic device comprising:
    a display; and
    at least one processor configured to:
       sense a hovering input on the display of the electronic device,
       sense a first height of an input means above the display at a first position of the display,
       display a first hovering input effect corresponding to the first height of the input means at the first position of the display,
       sense a second height of the input means above the display as the input means moves across the display to a second position of the display, the second height being different from the first height, and
       display a second hovering input effect corresponding to the second height of the input means at the second position of the display,
    wherein a magnitude of the second hovering input effect gradually changes from the first position of the display to the second position of the display according to a change in height of the input means from the first height to the second height.

11. The electronic device of claim 10, wherein the at least one processor is further configured to determine whether a function for sensing the first and second hovering inputs is active.

12. The electronic device of claim 10, wherein the input means comprises a touch pen or a finger.

13. The electronic device of claim 12, wherein the touch pen includes a coil and the display includes a touch screen, and
    wherein the touch screen includes an ElectroMagnetic Resonance (EMR) touch panel for sensing the touch pen based on EMR.

14. The electronic device of claim 13, wherein the touch screen further includes a capacitive touch panel and the at least one processor distinguishes a touch on the capacitive touch panel from hovering over or a touch on the EMR touch panel.

15. The electronic device of claim 10, wherein the input means comprises a touch pen and the hovering input comprises at least one of pressing of a button of the touch pen, a tap of the touch pen, faster movement of the touch pen than a threshold velocity, and a touch on an icon.

16. The electronic device of claim 10, wherein each of the first and the second hovering input effect comprises at least one of a brush writing effect of changing a stroke thickness, a chisel effect of changing a carved depth, a spray effect of changing a spray area, a droplet falling effect of changing a spreading area, an ink spreading effect of changing a spreading area, and a stamp effect.

17. The electronic device of claim 10, wherein the at least one processor is further configured to detect selection of the first hovering input effect, and to determine whether the selected first hovering input effect supports a function for sensing the hovering input.

18. The electronic device of claim 10, wherein the at least one processor is further configured to display a pointer for the input means on the display.

* * * * *